US010550263B2

(12) United States Patent
Gallur Blanca et al.

(10) Patent No.: US 10,550,263 B2
(45) Date of Patent: *Feb. 4, 2020

(54) COMPOSITION FOR THE PREPARATION OF A NANOSTRUCTURED BIODEGRADABLE POLYMERIC MATERIAL, THE MATERIAL OBTAINED AND ITS APPLICATIONS

(71) Applicant: ITENE, INSTITUTO TECNOLÓGICO DEL EMBALAJE, TRANSPORTE Y LOGÍSTICA, Paterna (ES)

(72) Inventors: Miriam Gallur Blanca, Paterna (ES); Natalia Ortuño Mansilla, Paterna (ES); Susana Aucejo Romero, Paterna (ES); María Jordá Beneyto, Paterna (ES); Ana Galet Domingo, Paterna (ES); Mercedes Hortal Ramos, Paterna (ES)

(73) Assignee: ITENE, INSTITUTO TECHNOLÓDEL AMBALAJE, TRANSPORTE Y LOGÍSTICA, Paterna (ES)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,354

(22) Filed: Apr. 30, 2018

(65) Prior Publication Data
US 2018/0312687 A1 Nov. 1, 2018

Related U.S. Application Data

(63) Continuation of application No. 14/782,094, filed as application No. PCT/EP2014/056434 on Mar. 31, 2014, now Pat. No. 9,982,127.

(30) Foreign Application Priority Data

Apr. 4, 2013 (EP) ..................... 13382126

(51) Int. Cl.
| | |
|---|---|
| *C08L 67/04* | (2006.01) |
| *B29C 35/16* | (2006.01) |
| *B29C 39/00* | (2006.01) |
| *C08J 5/18* | (2006.01) |
| *B29K 35/00* | (2006.01) |
| *B29L 7/00* | (2006.01) |

(52) U.S. Cl.
CPC ............ *C08L 67/04* (2013.01); *B29C 35/16* (2013.01); *B29C 39/003* (2013.01); *C08J 5/18* (2013.01); *B29K 2005/00* (2013.01); *B29K 2035/00* (2013.01); *B29L 2007/00* (2013.01); *C08J 2367/04* (2013.01); *C08J 2467/04* (2013.01); *C08L 2201/06* (2013.01); *C08L 2205/025* (2013.01); *C08L 2205/03* (2013.01)

(58) Field of Classification Search
CPC ................ C08L 67/04; C08L 2201/06; C08L 2205/025; C08L 2205/03
See application file for complete search history.

(56) References Cited

U.S. PATENT DOCUMENTS

| | | | |
|---|---|---|---|
| 5,756,651 | A | 5/1998 | Chen et al. |
| 9,982,127 | B2 | 5/2018 | Blanca et al. |
| 2002/0198332 | A1 | 12/2002 | Kasemura |

FOREIGN PATENT DOCUMENTS

| | | |
|---|---|---|
| EP | 2364127 | 9/2011 |
| WO | 2010059214 | 5/2010 |
| WO | 2011030766 | 3/2011 |
| WO | 2012017025 | 2/2012 |
| WO | 2012021108 | 2/2012 |
| WO | 2012052186 | 4/2012 |

OTHER PUBLICATIONS

International Search Report, International Application No. PCT/EP2014/056434, dated Apr. 17, 2014, 3 pages.
Berthe, V. et al., "Ageing of different biodegradable polyesters blends mechanical and hygrothermal behavior," Polymer Degradation and Stabliity, 2010, vol. 95, pp. 262-269, Elsevier Ltd.
Liang, Ji-Zhao et al., "Crystalline properties of poly(L-lactic acid) compositions filled with nanometer calcium carbonate, Composites: Part B," vol. 45, pp. 1646-1650, Elseview Ltd.
Pensec, S. et al., "Stereocomplex formation in enantiomeric diblock and triblock copolymers of poly(e-caprolactone) and polylactide," Polymer Bulletin, Dec. 2000, vol. 45, Issue 4-5, pp. 373-380.

*Primary Examiner* — Robert S Jones
(74) *Attorney, Agent, or Firm* — Barnes & Thornburg LLP

(57) ABSTRACT

The composition comprises a mixture of: i) poly(L-, D-lactide) homopolymer and, optionally, poly(ε-caprolactone) homopolymer, and ii) poly(L-lactide) and poly(ε-caprolactone) diblock copolymer, where said copolymer has a molar mass of the L-lactide block of 20,000 g/mol to 200,000 g/mol and a molar mass of the ε-caprolactone block of 10,000 g/mol to 100,000 g/mol, with the molar ratio between the L-lactide block and the ε-caprolactone block of 2:1. The invention also refers to the nanostructured material obtained from this composition that is characterised by a nanostructure of two mutually self-assembled phases, one phase being formed by a polymeric matrix of poly(L-, D-lactide) units and the other phase by poly(ε-caprolactone) units self-assembled with the matrix and also its use for the manufacture of a plastic article in the form of a transparent film or thin sheet.

19 Claims, 9 Drawing Sheets

(1.1)　　　(1.2)

(2.1)　　　(2.2)

(3.1)        (3.2)

(4.1)        (4.2)

(5.1)　　　　　　　　　(5.2)

(6.1)　　　　　　　　　(6.2)

(7.1)          (7.2)

(8.1)          (8.2)

(9.1)              (9.2)

COMPOSITION FOR THE PREPARATION OF A NANOSTRUCTURED BIODEGRADABLE POLYMERIC MATERIAL, THE MATERIAL OBTAINED AND ITS APPLICATIONS

CROSS-REFERENCE TO RELATED APPLICATIONS

This application is a continuation application of U.S. patent application Ser. No. 14/782,094, filed Oct. 2, 2014, which is a national stage entry under 35 U.S.C. § 371 of PCT International Application No. PCT/EP2014/056434, filed Mar. 31, 2014, and claims the benefit of European Patent Application No. 13382126.4, filed Apr. 4, 2013, each of which is expressly incorporated by reference herein.

The present invention refers to a composition for the preparation of a new nanostructured biodegradable polymeric material, to the material obtained from this composition, to the methods for obtaining it and to the applications of this biodegradable polymeric material. The nanostructured biodegradable polymeric material has special application in the packaging sector, particularly in food packaging. It also has application in the coatings sector, for example for coating biomaterials with biomedical applications. The nanostructured biodegradable polymeric material obtained from the composition is presented in the form of a film or transparent thin sheet.

BACKGROUND OF THE INVENTION

Biodegradable resins are known in the state of the art, being interesting because of their environmental advantages and versatility. As part of the family of biodegradable polyesters, poly(lactic acid) or PLA is the most attractive due to its properties and ease of production. Poly(lactic acid) is an aliphatic polyester that contains or may contain two enantiomers, poly(D-lactic acid) and/or poly(L-lactic acid) as components of the polymer chain and depending on the preparation technique. PLA has many useful properties such as its low flammability, high resistance to ultraviolet rays and biocompatibility. PLA is also biologically degradable, which makes it an attractive polymeric material for the plastics industry.

However, the possible uses of PLA are limited because of its high fragility, its low elongation to breakage and inadequate mechanical properties for certain applications requiring rigidity. Furthermore, PLA has the property of presenting a relatively low barrier to oxygen and to water vapour compared to other conventional polymeric materials. Therefore there is a need to provide a PLA with improved barrier properties together with greater strength to thermal deformation and with improved physico-mechanical properties compared to commercial pure PLA grades. In this direction, many attempts have been made to develop new plastics based on PLA with improved properties. However, the solutions found to date are still unsatisfactory because in addition to making the product more expensive the improvement always requires an addition or mixture with another polymer and/or additive.

An attempt described in the state of the art for improving the mechanical properties of pure PLA was to mix PLA with other thermoplastic materials (see for example, the journal of *Polymer Degradation and Stability*, Vol. 95, 262-269 (2010), V. Berthé et al, "extrusion of mixtures of poly(L-lactic acid) with poly(ε-caprolactone)" the improving the water vapour barrier properties. However, the use of mixtures generally implies disadvantages or is subject to limitations of use. Mixtures of PLA with other thermoplastics must be prepared at high temperatures to ensure good homogenisation of the mixture so, on the one hand this limits the type of thermoplastic material to be combined with PLA and, on the other hand, requires temperature control because PLA starts to degrade at temperatures above 180° C. Furthermore, the majority of biodegradable polymers on the market are immiscible with PLA, which implies the use of compatibilisers, and this is a limitation to take into account in the preparation of mixtures of PLA with other thermoplastics.

Another of the ways for improving PLA properties has been through the development of nanocomposites, with the aim of improving both the mechanical properties and the barrier properties to oxygen and water vapour of pure PLA. There are studies based on the use of nanoparticles such as nano calcium carbonate (see, for example, Composites part B, Vol 45, 1646-1650 (2013), J-Z Liang et al, "Crystalline properties of poly (L-lactic acid) composites filled with nanometer calcium carbonate). This method only slightly improves the mechanical properties of traction resistance of PLA but does not improve the barrier properties.

A method developed for improving the barrier properties that can be cited is that described by the authors of the international patent application WO2012017025 where a process is described for obtaining a PLA nanocomposite with an organically modified laminar phyllosilicate that has improved barrier properties against oxygen and water vapour compared to pure PLA.

Also, international patent application WO201130766 describes a process for obtaining stereocomplexed poly (lactic acid) crystals. The PLA obtained by this process differs from that of conventional poly(lactic acid) in that it comprises a higher content of stereocomplexed PLA crystals. This composition has a high melting point and is useful in making a modelled body, synthetic fibre, porous body or an ionic conductor.

With respect to nanostructured biodegradable materials by diblock copolymers, the state of the art is limited to the development of diblock copolymers in the field of biomedical applications, for example, European patent EP2364127 describes an eye implant based on a biodegradable membrane configured for a specific region of the eye. This eye implant in the form of a flexible membrane contains an active ingredient that is implanted between the intraocular lens and the surface of the posterior capsule of the eye. Its aim is to inhibit migration of epithelial cells after cataract surgery.

Also, the international application WO201221108 describes a biodegradable eye implant with a controlled release drug and a method of treatment of ocular inflammatory diseases. This implant degrades by simple hydrolysis in the body and comprises a first layer containing a biodegradable polymer and a drug dispersed or dissolved in this polymer. A multiple layer biodegradable eye implant is also described, with a first layer that is described to be on top and a second layer that comprises in turn a second biodegradable polymer arranged adjacent to the first layer.

Finally, international patent application WO201252186 describes block copolymers containing one block with one or more L- or D-lactide monomer units and one block with one or more monomer units other than L- or D-lactide. This document refers to the use of this copolymer for the preparation of a plastic article that has higher resistance to thermal deformation than pure PLA with an identical number of L- or D-lactide monomer units. This copolymer contains a block of poly(methyl methacrylate) (PMMA). The block with one or more monomer units other than L- or D-lactide is selected from styrene, acrylate, particularly MMA, olefins, particularly propylene and its derivatives; this fact implies that this block copolymer loses its biodegradability.

The synthesis of copolymers with different molar ratios has also been investigated in the literature and their crystallinity, thermal properties and morphology have been studied. The techniques most often employed for obtaining these materials have been "Spin coating" or "Solvent coating" but materials with macroscopic properties that can have commercial applications have not been provided to date.

Therefore, there is still the need to provide polymeric materials based on PLA that have improved physico-chemical properties and, especially, materials in which the barrier properties against oxygen and water vapour can be modulated depending on the needs of the application. There is still no polymeric material in the state of the art that has the properties of selective permeability to oxygen and water vapour modulated to application requirements and that has not been obtained through the addition of a nano-reinforcement. To obtain this improvement in the permeability properties without detriment to other properties such as transparency or other decisive properties for use is without doubt a problem still to be resolved.

BRIEF DESCRIPTION OF THE INVENTION

Therefore, the object of the present invention is to provide a polymeric material that solves the problems of the state of the art, providing also other advantages that will be described below in the description.

The present invention provides a biodegradable composition for the preparation of a new nanostructured biodegradable polymeric material with properties of selective permeability and improvements compared to pure PLA that also provides good mechanical, transparency and thermal stability properties. The material obtained from this composition is presented in the form of a film or transparent thin sheet.

Thus, in a first aspect, the invention provides a biodegradable composition for the preparation of a nanostructured biodegradable polymeric material that is characterised by comprising
a mixture of:
i) poly(L-, D-lactide) homopolymer (PLA) and, optionally, poly($\varepsilon$-caprolactone) homopolymer (PCL), and
ii) poly(L-lactide) and poly($\varepsilon$-caprolactone) diblock copolymer, where this copolymer has a molar mass of the poly(L-lactide) block of between 20,000 g/mol and 200,000 g/mol and a molar mass of poly($\varepsilon$-caprolactone) block of between 10,000 g/mol and 100,000 g/mol, with the molar ratio between the poly(L-lactide) block and the poly($\varepsilon$-caprolactone) block being 2:1.

In one embodiment, this composition comprises a mixture of:
i) poly(L-, D-lactide) homopolymer (PLA) and poly($\varepsilon$-caprolactone) homopolymer (PCL) and
ii) poly(L-lactide) and poly($\varepsilon$-caprolactone) diblock copolymer, where this copolymer has a molar mass of the poly(L-lactide) block of between 20,000 g/mol and 200,000 g/mol and a molar mass of poly($\varepsilon$-caprolactone) block of between 10,000 g/mol and 100,000 g/mol, with the molar ratio between the poly(L-lactide) block and the poly($\varepsilon$-caprolactone) block being 2:1.

In a second aspect, the invention refers to methods for obtaining this nanostructured biodegradable polymeric material from this composition. Included in the methods developed is a method based on solution and evaporation ("solvent casting"), a method of moulding by compression ("compression moulding") and a method of moulding by extrusion ("extrusion moulding").

The stages of the three methods that may be useful for preparation are described below. In accordance with the method of solution and evaporation, the following stages are carried out:
a) preparing a solution of poly(L-, D-lactide) homopolymer (PLA) of from 0.5% to 10% by weight, preferably from 1% to 8% and, optionally, a solution of poly($\varepsilon$-caprolactone) homopolymer (PCL) of from 0.5% to 10% by weight, preferably from 1% to 8%, with a polar organic solvent at a temperature below the boiling point of the solvent used;
b) preparing a solution of poly(L-lactide) and poly($\varepsilon$-caprolactone) diblock copolymer of 0.5% to 10% by weight, preferably from 1% to 8%, with a polar organic solvent at a temperature below the boiling point of the solvent used;
c) mixing the solutions prepared in stages a) and b) keeping the temperature constant until homogenisation of the mixture components;
d) pouring the mixture obtained in stage c) on a flat surface and allowing the solvent to evaporate at ambient temperature until the formation of a film or thin sheet; and finally,
e) releasing from the mould to obtain the film or thin sheet of nanostructured biodegradable polymeric material.

In accordance with the method of moulding by compression, the following stages are carried out:
a) preparing a film or thin sheet of nanostructured biodegradable polymeric material by
a.1) the previous method of solution and evaporation or
a.2) from the components of the composition in the form of pellets in the proportions desired, followed by drying, mixing the components and compression of the mixture between two plates by the application of pressure cycles until obtaining the film or thin sheet;
b) freezing the film or thin sheet of stage a) with an inert gas;
c) milling the film or thin sheet to a particle size of between 50 µm and 150 µm; and
d) placing the powder between two plates and apply cycles of pressure until obtaining a thin sheet of nanostructured biodegradable polymeric material with a thickness of between 175 and 225 µm.

In accordance with the method of moulding by extrusion, the following stages are carried out:
a) drying of the components of the composition;
b) adding of the dried components in the proportions desired in a twin-screw type extruder to make the film or thin sheet of nanostructured biodegradable polymeric material.

It is preferable to obtain the nanostructured biodegradable polymeric material by the method of extrusion.

In another aspect, the present invention provides a nanostructured biodegradable polymeric material obtained from a defined composition according to the first aspect of the invention. In particular, it provides a nanostructured biodegradable polymeric material that is characterised by presenting a nanostructure of two mutually self-assembling phases, with one phase being formed by a polymeric matrix of poly(L-, D-lactide) monomer units and the other phase by poly(ε-caprolactone) monomer units self-assembled with the matrix.

The invention also refers to the use of the nanostructured biodegradable polymeric material for the preparation of a plastic article, in particular for the preparation of a film or transparent thin sheet with properties of selective permeability and improvements compared to pure PLA and comparable with other polymers such as polystyrene (PS).

In a final aspect, the invention refers to a plastic article in the form of a film or thin sheet that includes the nanostructured biodegradable polymeric material of the invention.

Definitions

Nanostructuring by the use of diblock copolymers consists of the creation of ordered structures at the nanometric scale through chemical interactions, without additives or incorporating nano reinforcements. The final morphology adopted by the material and its self-assembly capacity is produced by immiscibility of one of the blocks. These different morphologies translate into different properties in the nanostructured material obtained.

The present invention refers to a biodegradable aliphatic polyester resin, PLA homopolymer, that has been nanostructured using a diblock copolymer based on poly(L-lactide) and poly(ε-caprolactone) (CPB). The polymeric matrix is mainly composed of this polyester resin (PLA) and is self-assembled with this diblock copolymer. This copolymer comprises a block consisting of one or several poly(L-lactide) stereoisomer monomer units and another block consisting of one or several poly(ε-caprolactone) monomer units.

In the present invention, the term "nanostructured biodegradable polymeric material" is understood to mean a biodegradable polymeric matrix with a morphology on the nanometric scale. This order is achieved owing to the interaction between the polymeric matrix of the PLA homopolymer and the diblock copolymer (CPB), also biodegradable at the concentrations established.

In the present invention, the term "PLA homopolymer" or "poly(L-, D-lactide) homopolymer" is understood to be a biodegradable aliphatic polyester resin obtained from renewable sources. The term "PLA homopolymer" includes: poly(L-lactide) (PLLA), the product resulting from the polymerisation of poly(D-lactide) (PDLA) and the product resulting from the polymerisation of poly(L-lactide) and poly(D-lactide) (racemic mixture). All the commercial grades are included in the term PLA, including those that have different ratios of PLLA and PDLA. Thus, the term "PLA homopolymer" is understood to be both PLLA, PDLA and mixtures of PLLA and PDLA. It is preferably understood to be mixtures of PLLA and PDLA.

In accordance with the invention, the poly(L-, D-lactide) homopolymer (PLA) can form part of a mixture of resins with a biodegradable polyester base. Thus, for example, the present invention contemplates the addition of a mixture of commercially available polyester base resins containing poly(L-, D-lactide) homopolymer (PLA), adding the appropriate amount of this commercial mixture to the composition of the invention to provide the defined PLA percentage to the composition.

In the present invention, the term "PCL homopolymer" or "poly(ε-caprolactone) homopolymer" is understood to be a biodegradable polymer with a low melting point, around 60° C. and a glass transition temperature of approximately −60° C. The PCL can be obtained by polymerisation of the open ring of ε-caprolactone using a catalyst such as tin octanoate.

The structural formula of PCL is included below:

Poly(ε-caprolactone) (PCL), a biodegradable synthetic polyester has a melting point of 78° C., with an enthalpy of melting of 40 J/g, both thermal properties determined by differential scanning calorimetry.

In the present invention, the term "poly(L-lactide) and poly(ε-caprolactone) diblock copolymer", which can also be expressed as poly(L-lactide-b-ε-caprolactone) diblock copolymer, has a molar mass of the L-lactide block of 40,000 g/mol and a molar mass of the ε-caprolactone block of 20,000 g/mol. It is also abbreviated in the present invention with the initials "CPB". The diblock copolymer of the invention was obtained by controlled polymeric synthesis with a specific morphology of mutually linked blocks. This copolymer was obtained from two biodegradable polyesters that are poly(L-lactide) and poly(ε-caprolactone). Thus, in accordance with the present invention, the copolymer contains one block of very pure PLA that is formed only by the PLLA (poly(L-lactide) stereoisomer).

DETAILED DESCRIPTION OF THE INVENTION

The present invention provides a biodegradable composition for the preparation of a new nanostructured biodegradable polymeric material that is characterised by comprising a mixture of:

i) poly(L-, D-lactide) homopolymer (PLA) and, optionally, poly(ε-caprolactone) homopolymer (PCL), and ii) poly(L-lactide) and poly(ε-caprolactone) diblock copolymer, where this copolymer has a molar mass of the poly(L-lactide) block of between 20,000 g/mol and 200,000 g/mol and a molar mass of poly(ε-caprolactone) block of between 10,000 g/mol and 100,000 g/mol, with the molar ratio between the poly(L-lactide) block and the poly(ε-caprolactone) block being 2:1.

Advantageously, with the composition of the present invention, a new nanostructured biodegradable polymeric material is provided that has the properties of selective permeability and that improves the barrier properties compared to pure PLA. Surprisingly, the authors of the present invention have found that with the composition of the first aspect of the invention, a nanostructured biodegradable polymeric material can be prepared with permeability to oxygen of up to 40% lower than that of pure PLA with an identical number of L- or D-lactide monomer units. Also advantageously, with the composition of the first aspect of the invention, a nanostructured biodegradable polymeric material can be prepared with permeability to water vapour of up to 15% lower than that of pure PLA with an identical number of L- or D-lactide monomer units. Also with the composition of the first aspect, a new nanostructured material can be obtained with barrier properties that can be adapted to the application needs of this material, by only changing the ratio between the poly(L-, D-lactide) (PLA) homopolymer, the poly(ε-caprolactone) (PCL) homopolymer and the poly(L-lactide) and poly(ε-caprolactone) diblock copolymer (CPB).

In turn, the mixture of composition components enables the creation of a new ordered structure at nanometric scale without any addition or inclusion of other polymers or nano reinforcements.

In accordance with an embodiment of the invention, the biodegradable composition comprises a mixture of:

i) poly(L-, D-lactide) homopolymer (PLA) and ii) poly(L-lactide) and poly(ε-caprolactone) diblock copolymer (CPB), where this copolymer has a molar mass of the poly(L-lactide) block of between 20,000 g/mol and 200,000 g/mol and a molar mass of the poly(ε-caprolactone) block of between 10,000 g/mol and 100,000 g/mol, preferably a molar mass of the L-lactide block of 40,000 g/mol and a molar mass of the ε-caprolactone block of 20,000 g/mol, with the ratio of molar mass between the poly(L-lactide) block to the poly(ε-caprolactone) block of 2:1, in which the diblock copolymer is in a concentration of between 10% and 90% in weight compared to the weight of poly(L-, D-lactide) homopolymer (PLA), preferably in a concentration of between 20% and 80% by weight, still more preferably of between 20% and 40% by weight compared to the weight of the poly(L-, D-lactide) homopolymer (PLA).

The authors of the present invention have observed that one of the blocks [poly(L-lactic acid)] of the diblock copolymer is symmetrical, semi-crystalline and biodegradable, is miscible with the poly(lactic acid) matrix whereas the other block [poly(ε-caprolactone)] is not miscible with this matrix, ensuring that the separation of micro-phases is achieved in this way and that the desired nano-structuring takes place. This self-assembly enables forming different micro- or nano-structures that make the material adopt various morphologies, modifying its final properties. Advantageously, the nanostructured biodegradable polymeric material of the first aspect of the invention has properties derived from the morphology obtained in the nanostructuring without the need to add other polymeric materials to serve as reinforcement materials.

The hydrophilicity of the diblock copolymer and its physical properties, both mechanical and thermal, can be modulated by adjusting its ratio with respect to the PLA homopolymer of the mixture.

Thus the nanostructured biodegradable polymeric material obtained from this composition is characterised by the fact that it presents a nanostructure of two mutually self-assembled phases, one phase being formed by a polymeric matrix of poly(L-, D-lactide) monomer units and the other phase by poly(ε-caprolactone) monomer units self-assembled with the matrix.

Advantageously, a composition in which the molar volume (Vm) of the poly(ε-caprolactone) block of the diblock copolymer is between 3.26% vol and 30.4% vol compared to the total molar volume of the composition is preferred. This variation of molar volume of the poly(ε-caprolactone) block compared to the molar volume of the composition total corresponds to a variation of concentration of the diblock copolymer from 10% to 90% by weight compared to the composition total as shown in Table 1 below.

TABLE 1

| Binary mixture composition % by weight (% PLA/% CPB) | % by molar volume of the ε-caprolactone block of the copolymer in the binary composition ε-CL (% vol) |
|---|---|
| 90/10 | 3.26 |
| 80/20 | 6.5 |
| 70/30 | 9.8 |
| 60/40 | 13.06 |
| 50/50 | 16.32 |
| 30/70 | 22.5 |
| 20/80 | 25.88 |
| 10/90 | 32.65 |

With this composition a nanostructured biodegradable polymeric material can be prepared in which the phase formed by poly(ε-caprolactone) monomer units has a nanometric morphology selected from spherical micelles, interconnected micelles and wormlike micelles.

The composition of the first aspect of the invention provides a nanostructured biodegradable polymeric material that has the properties of selective permeability and improvements compared to pure PLA. In particular, it has oxygen permeability of up to 40% lower than that of pure PLA with an identical number of L- or D-lactide monomer units and permeability to water vapour of up to 15% lower than that of pure PLA with an identical number of L- or D-lactide monomer units. Furthermore, the nanostructured material obtained is environmentally friendly, has good mechanical properties, is transparent and has thermal stability.

The nanostructured material obtained from this composition has application in the manufacture of plastic articles and, particularly, is presented in the form of a film or transparent thin sheet.

Thus the present invention also refers in one of its aspects to the plastic article, the film or thin sheet, which includes this nanostructured biodegradable polymeric material. This plastic article can be a shaped plastic article, a semi-worked plastic article, particularly a material for the development of containers and/or biomedical applications.

In one embodiment of the invention, depending on the application of the transparent plastic article, the permeability to oxygen of a nanostructured biodegradable polymeric material can be designed to be a value defined in the interval from 370 cm$^3$/m$^2$·day to 80 cm$^3$/m$^2$·day, and the permeability to water vapour can be designed to be a value defined in the interval from 150 mg/m$^2$·day to 30 mg/m$^2$·day, given any combination of both intervals, with a transmittance of between 89% and 99%.

Another property that is modified compared to pure PLA is the glass transition temperature (Tg). The nanostructured biodegradable polymeric material obtained from this composition has a glass transition temperature (Tg) less than 46° C., preferably less than 44° C. This is due to the inclusion of ε-caprolactone monomer units that can be responsible for inducing a plasticising effect in nanostructuring, causing displacements in the glass transition temperatures (Tg) of PLA towards lower temperature ranges.

In relation to biodegradability, the use of the diblock copolymer formed by a symmetrical block composed of a linear block of [poly(L-lactide)] covalently linked to a block of [poly(ε-caprolactone)], biodegradable and biocompatible with PLA, maintains or at least does not alter the final biodegradability of the new material obtained once it is nanostructured.

In accordance with another embodiment of the invention, the biodegradable composition for the preparation of a new nanostructured biodegradable polymeric material comprises a mixture of:

i) poly(L-, D-lactide) homopolymer (PLA) and poly(ε-caprolactone) homopolymer (PCL) and ii) poly(L-lactide) and poly(ε-caprolactone) diblock copolymer (CPB), where this copolymer has a molar mass of the L-lactide block of between 20,000 g/mol and 200,000 g/mol and a molar mass of the ε-caprolactone block of between 10,000 g/mol and 100,000 g/mol, preferably a molar mass of the L-lactide block of 40,000 g/mol and a molar mass of the ε-caprolactone block of 20,000 g/mol, with the ratio of molar mass between the poly(L-lactide) block to the poly (ε-caprolactone) block of 2:1, in which the PLA homopolymer is in a concentration of between 60% and 80% by weight compared to the total of the two homopolymers PLA and PCL, preferably the PLA homopolymer is at a concentration of 70% by weight compared to the total weight of the two homopolymers PLA and PCL, and in which the diblock copolymer (CPB) is at a concentration of between 1% and 30% by weight, preferably between 1% and 10% by weight compared to the total weight of the two homopolymers PLA and PCL.

The authors of the present invention have found that the diblock copolymer acts as a compatibilizing agent between the matrices of the two homopolymers PLA and PCL because of the miscibility of each of the copolymer blocks with each of the PLA and PCL matrices. The mixture of PLA with PCL enables reducing the fragility of the PLA, derived from its high glass transition temperature, and therefore the search for new applications.

Thus the nanostructured biodegradable polymeric material obtained from this composition is characterised by the fact that it presents a nanostructure of two mutually self-assembled phases, one phase being formed by a polymeric matrix of poly(L-, D-lactide) monomer units and the other phase by poly(ε-caprolactone) monomer units self-assembled with the matrix.

With this composition a nanostructured biodegradable polymeric material can be prepared in which the phase formed by poly(ε-caprolactone) monomer units has a nanometric morphology selected from spherical micelles, interconnected micelles and wormlike micelles.

Advantageously, a composition in which the molar volume of the poly(ε-caprolactone) block of the diblock copolymer is between 0.33% vol and 9.80% vol compared to the total molar volume of the two homopolymers is preferred. This variation of the molar volume of the poly(ε-caprolactone) block compared to the molar volume of the two homopolymers PLA and PCL corresponds to a variation of the concentration of the diblock copolymer of 1% to 30% by weight compared to the content of the two homopolymers PLA and PCL in the composition as shown in Table 2 below.

TABLE 2

| Ternary mixture composition | % in molar volume of each of the copolymer blocks in the ternary composition | |
|---|---|---|
| % by weight (% PLA/% PCL/% CPB) | L-lactide (% vol) | ε-CL (% vol) |
| 80/20/1 | 0.54 | 0.33 |
| 80/20/3 | 1.61 | 0.98 |
| 80/20/5 | 2.69 | 1.63 |
| 80/20/7 | 3.76 | 2.29 |
| 80/20/10 | 5.38 | 3.27 |
| 80/20/15 | 8.06 | 4.90 |
| 80/20/20 | 10.75 | 6.54 |
| 80/20/25 | 13.44 | 8.17 |
| 80/20/30 | 16.13 | 9.80 |

It is essential that the diblock copolymer consists of one or more blocks poly(L-lactide) monomer units and one or more blocks of poly(ε-caprolactone) monomer units. The diblock copolymer only contains the L-lactide stereoisomer in the poly(L-lactide) block.

The composition that comprises a mixture of i) poly(L-, D-lactide) homopolymer (PLA) and poly(ε-caprolactone) homopolymer (PCL) and ii) poly(L-lactide) and poly(ε-caprolactone) diblock copolymer provides a nanostructured biodegradable polymeric material that has the properties of selective permeability. In particular, it has oxygen permeability of up to 30% lower than that of pure PLA with an identical number of L- or D-lactide monomer units and a permeability to water vapour of up to 15% lower than that of pure PLA with an identical number of L- or D-lactide monomer units. Advantageously, the nanostructured material obtained maintains its biodegradability, has good mechanical properties, is transparent and is thermally stable compared to the properties of pure PLA with an identical number of L- or D-lactide monomer units and of pure PCL with an identical number of (ε-caprolactone) monomer units.

With the composition of the first aspect of the invention, a nanostructured biodegradable polymeric material is provided with lower fragility than pure PLA with an identical number of L- or D-lactide monomer units and higher than each of the PLA/PCL series that does not have CPB. The results obtained have shown that the PLA matrix with a high molecular weight is immiscible with the PCL matrix, so that the morphology of the mixtures has a low adhesion resistance, not achieving the desired mechanical properties. However, because of the addition to the composition of the poly(L-lactide) and poly(ε-caprolactone) diblock copolymer that acts as a compatibilizing agent between both matrices, miscibility of each of the copolymer blocks with each of the PLA and PCL matrices is achieved. The achievement of nanostructuring of the compositions of the invention also brings about improvement in other properties.

In a second aspect, the invention refers to methods for obtaining this nanostructured biodegradable polymeric material from the composition for its preparation. The methods developed include a method based on solution and evaporation, a method of moulding by compression and, finally, a method of moulding by extrusion.

The nanostructured biodegradable polymeric material obtained from the composition can be prepared by the following solution and evaporation technique via the following stages:

a) preparing a solution of poly(L-, D-lactide) homopolymer (PLA) of from 0.5% to 10% by weight, preferably from 1% to 8% and, optionally, a solution of poly(ε-caprolactone) homopolymer (PCL) of from 0.5% to 10% by weight, preferably from 1% to 8%, with a polar organic solvent at a temperature below the boiling point of the solvent used;

b) preparing a solution of poly(L-lactide) and poly(ε-caprolactone) diblock copolymer of 0.5% to 10% by weight, preferably from 1% to 8%, with a polar organic solvent at a temperature below the boiling point of the solvent used;

mixing the solutions prepared in stages a) and b) keeping the temperature constant until homogenisation of the mixture components;

c) pouring the mixture obtained in stage c) on a flat surface and allowing the solvent to evaporate at ambient temperature until the formation of a film or thin sheet; and finally, d) releasing the film or thin sheet of nanostructured biodegradable polymeric material from the mould.

Advantageously, stages a), b) and c) are carried out at a temperature of between 20 and 60° C., preferably at a temperature of between 35 and 45° C.

The polar organic solvent used can be selected from chloroform, dichloromethane, acetone, methylene chloride and tetrahydrofuran.

Also advantageously, the solutions of the homopolymers and diblock copolymer can be made in a polar organic solvent that can be from 0.5% to 10% by weight, preferably from 0.7% to 7%, more preferably from 0.9% to 5% and still more preferably from 1% to 5%.

Adding the appropriate proportions of each of the composition components described in the first aspect of the present invention at the corresponding stage is part of the scope of the present invention.

Alternatively, the nanostructured biodegradable polymeric material obtained from the composition can be prepared by the following moulding by compression technique by the following stages:
a) preparing a film or thin sheet of nanostructured biodegradable polymeric material by
 a.1) the previous method of solution and evaporation or
 a.2) from the components of the composition in the form of pellets in the proportions desired, followed by drying, mixing the components and compression of the mixture between two plates by the application of pressure cycles until obtaining the film or thin sheet;
b) freezing the film or thin sheet of stage a) with an inert gas such as, for example, liquid nitrogen;
c) milling the film or thin sheet to obtain a powder with a particle size of between 50 μm and 150 μm;
d) placing the powder between two plates and moulding the mixture between two plates by apply cycles of pressure until obtaining a thin sheet of nanostructured biodegradable polymeric material with a thickness of between 175 and 225 μm.

Adding the appropriate proportions of each of the composition components described in the first aspect of the present invention at the corresponding stage is part of the scope of the present invention.

Also alternatively, the nanostructured biodegradable polymeric material obtained from the composition can be prepared by the following moulding by extrusion technique by the following stages:
a) drying of the components of the composition, the components being in the form of pellets or powder;
b) processing the dried components at the concentration desired in a twin-screw type extruder to obtain a film or thin sheet.

Adding the appropriate proportions of each of the composition components described in the first aspect of the present invention at the corresponding stage is part of the scope of the present invention.

Nanostructuring of the PLA and the changes in crystallinity have effects on the macroscopic properties. These changes also affect the elasticity and strength of the materials obtained in this way. Other aspects of the present invention will be evident from the following description, the examples and the attached claims.

BRIEF DESCRIPTION OF THE FIGURES

For a better understanding of the description above, some figures are appended schematically representing a practical case of embodiment and only of a non-limiting example.

Note: The percentages by weight of diblock copolymer are with respect to the total weight of the PLA and PCL homopolymers.

Figure 10:
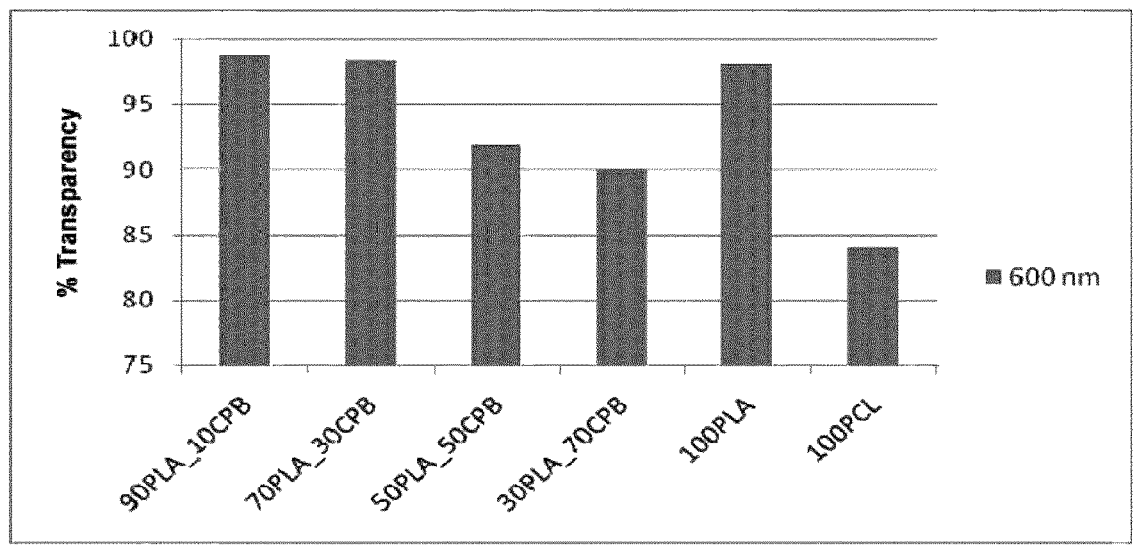
Figure 11:
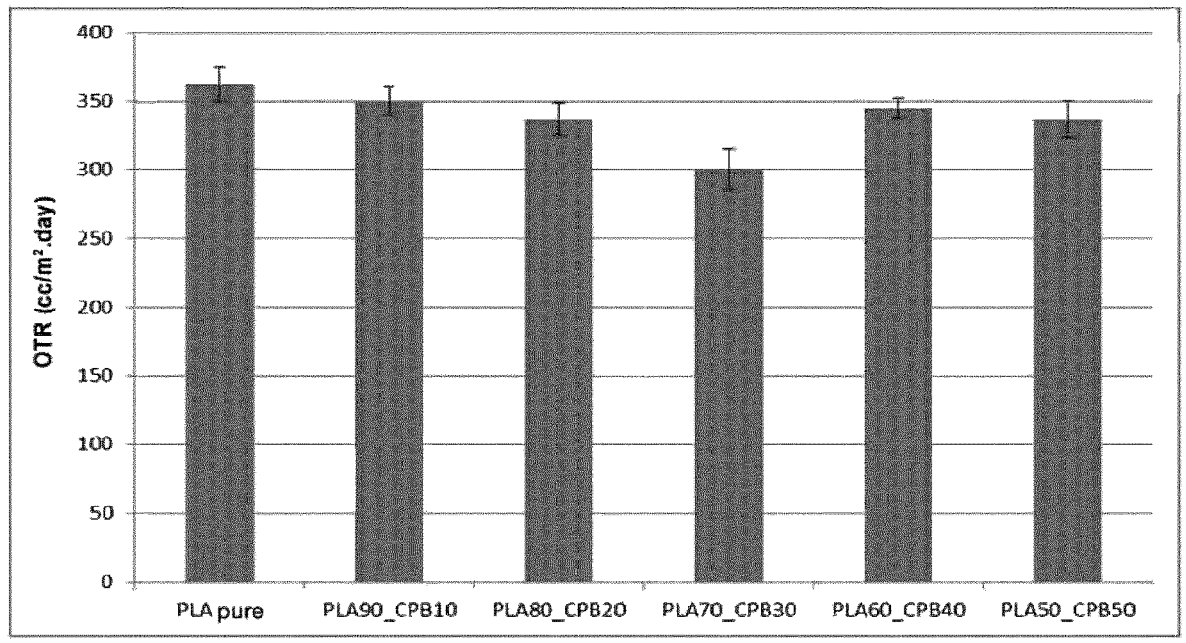

FIG. 10 shows a bar diagram with transparency values for a composition with PLA and CPB binary mixtures in the following proportions by weight of each of the components:
 90% by weight of PLA and 10% by weight of diblock copolymer (CPB)
 70% by weight of PLA and 30% by weight of diblock copolymer (CPB)
 50% by weight of PLA and 50% by weight of diblock copolymer (CPB)
 30% by weight of PLA and 70% by weight of diblock copolymer (CPB)
 100% by weight of PLA
 100% by weight of CPB FIG. 11 shows a bar diagram with the oxygen transmission rate (OTR) ($cm^3/m^2 \cdot day$) for a composition with PLA and CPB binary mixtures in the following proportions by weight of each of the components:
 100% by weight of PLA
 90% by weight of PLA and 10% by weight of diblock copolymer (CPB)
 70% by weight of PLA and 30% by weight of diblock copolymer (CPB)
 60% by weight of PLA and 40% by weight of diblock copolymer (CPB)
 50% by weight of PLA and 50% by weight of diblock copolymer (CPB)

Figure 12:
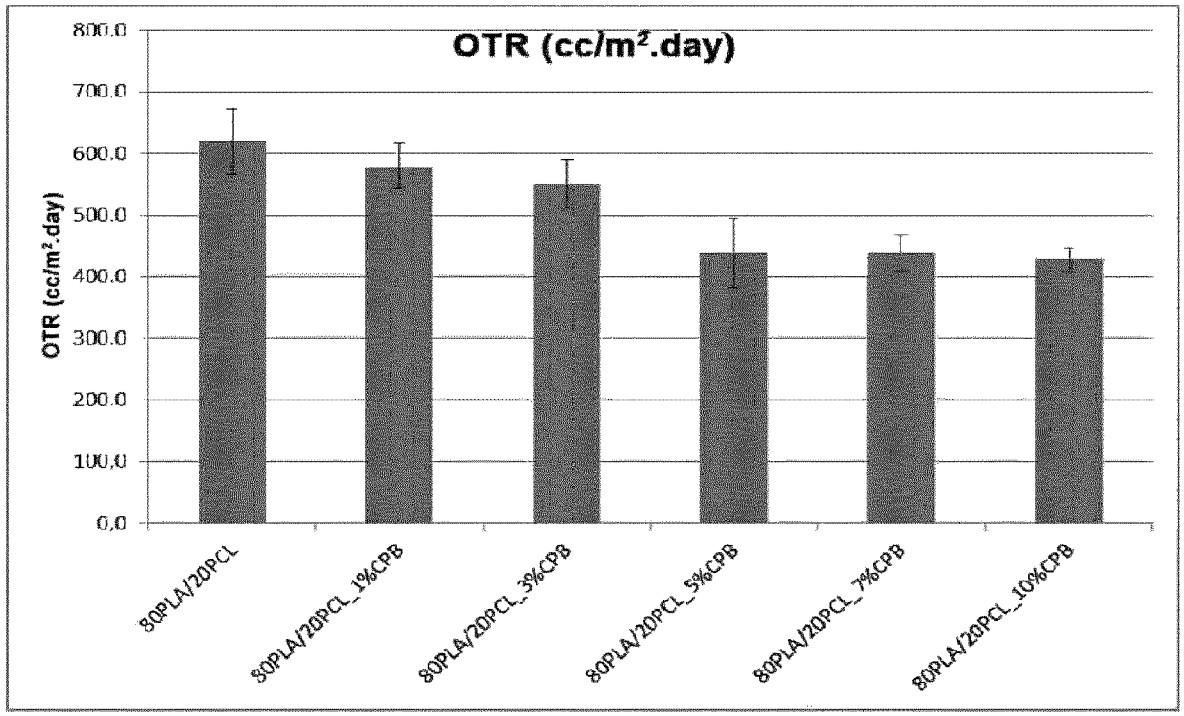

FIG. 12 shows a bar diagram with oxygen transmission rates (OTR) ($cm^3/m^2 \cdot day$) for a composition with ternary mixtures of PLA, PCL and CPB in the following proportions by weight:
 80% by weight of PLA and 20% by weight of PCL
 80% by weight of PLA and 20% by weight of PCL and 1% by weight of diblock copolymer (CPB)
 80% by weight of PLA and 20% by weight of PCL and 3% by weight of diblock copolymer (CPB)
 80% by weight of PLA and 20% by weight of PCL and 5% by weight of diblock copolymer (CPB)
 80% by weight of PLA and 20% by weight of PCL and 10% by weight of diblock copolymer (CPB)

Note: The percentages by weight of diblock copolymer are with respect to the total weight of the PLA and PCL homopolymers.

Figure 13:
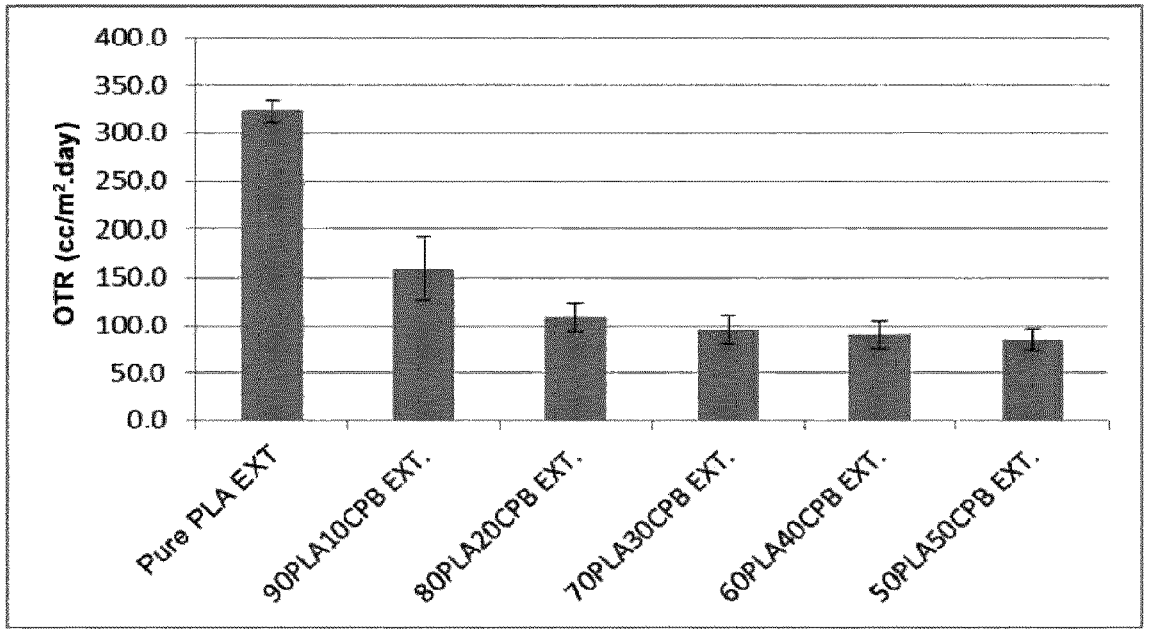

FIG. 13 shows a bar diagram with the oxygen transmission rate (OTR) (cm$^3$/m$^2$·day) for a composition with PLA and CPB binary mixtures obtained by the extrusion method in the following proportions by weight of each of the components:
- 100% by weight of PLA
- 90% by weight of PLA and 10% by weight of diblock copolymer (CPB)
- 80% by weight of PLA and 20% by weight of diblock copolymer (CPB)
- 70% by weight of PLA and 30% by weight of diblock copolymer (CPB)
- 60% by weight of PLA and 40% by weight of diblock copolymer (CPB)
- 50% by weight of PLA and 50% by weight of diblock copolymer (CPB)

Figure 14:
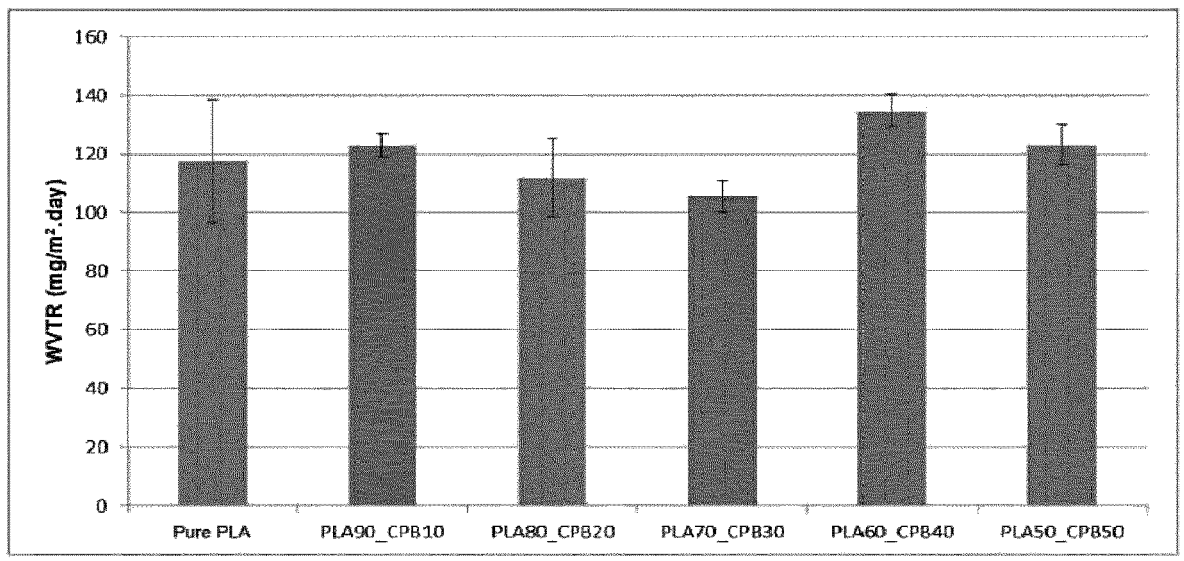

FIG. 14 shows a bar diagram with water vapour permeability values (mg/m$^2$·day) for a composition with PLA and CPB binary mixtures in the following proportions be weight of each of the components:
- 100% by weight of PLA
- 90% by weight of PLA and 10% by weight of diblock copolymer (CPB)
- 80% by weight of PLA and 20% by weight of diblock copolymer (CPB)
- 70% by weight of PLA and 30% by weight of diblock copolymer (CPB)
- 60% by weight of PLA and 40% by weight of diblock copolymer (CPB)
- 50% by weight of PLA and 50% by weight of diblock copolymer (CPB)

Figure 15:
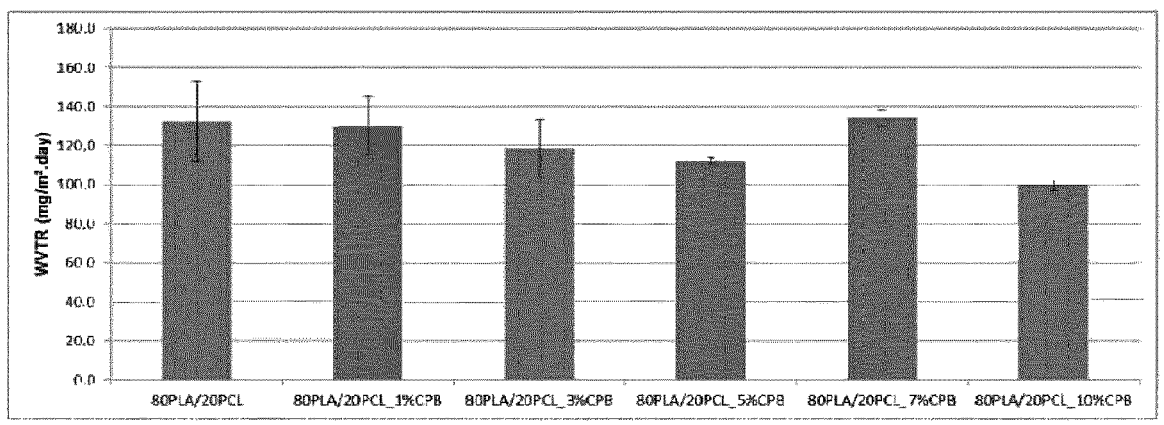

FIG. 15 shows a bar diagram with water vapour permeability values (mg/m$^2$·day) for a composition with PLA, PCL, CPB ternary mixtures in the following proportions by weight:
- 80% by weight of PLA and 20% by weight of PCL
- 80% by weight of PLA and 20% by weight of PCL and 1% by weight of diblock copolymer (CPB)
- 80% by weight of PLA and 20% by weight of PCL and 3% by weight of diblock copolymer (CPB)
- 80% by weight of PLA and 20% by weight of PCL and 5% by weight of diblock copolymer (CPB)
- 80% by weight of PLA and 20% by weight of PCL and 10% by weight of diblock copolymer (CPB)

Note: The percentages by weight of diblock copolymer are with respect to the total weight of the PLA and PCL homopolymers.

Figure 16:
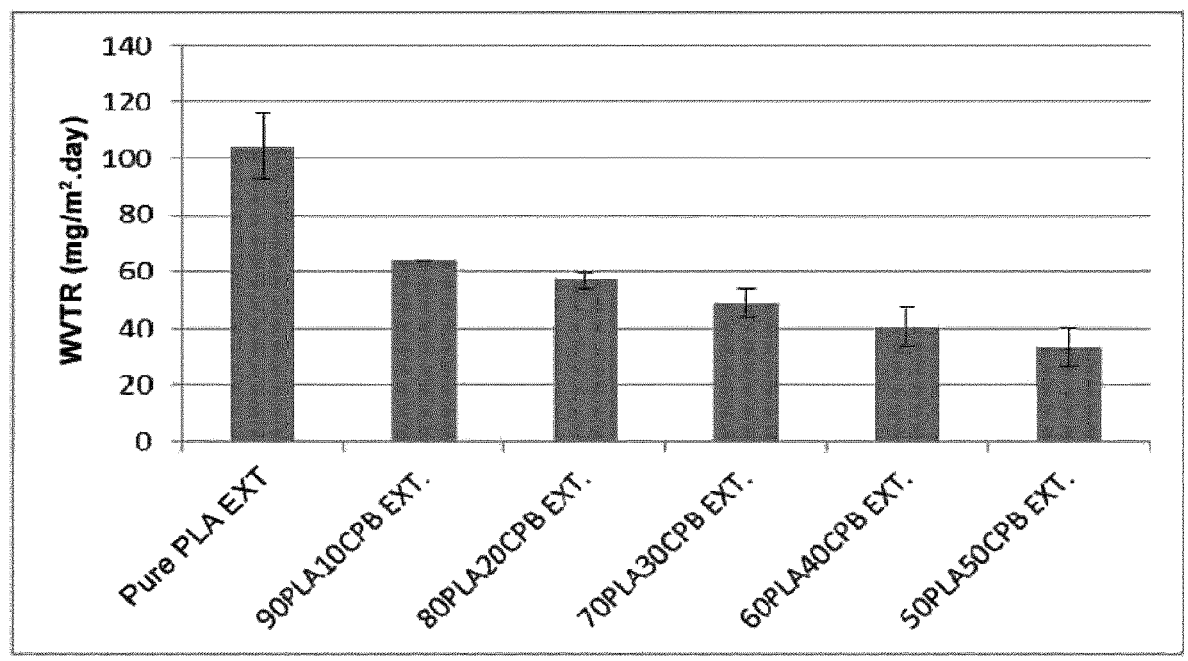

FIG. 16 shows a bar diagram with water vapour permeability values (mg/m$^2$·day) for a composition with PLA and CPB binary mixtures obtained by the extrusion method in the following proportions by weight of each of the components:
- 100% by weight of PLA
- 90% by weight of PLA and 10% by weight of diblock copolymer (CPB)
- 80% by weight of PLA and 20% by weight of diblock copolymer (CPB)
- 70% by weight of PLA and 30% by weight of diblock copolymer (CPB)
- 60% by weight of PLA and 40% by weight of diblock copolymer (CPB)
- 50% by weight of PLA and 50% by weight of diblock copolymer (CPB)

DESCRIPTION OF PREFERRED EMBODIMENTS

Examples and Tests

PLA Used in the Examples

The molecular weight of PLA was obtained by the gel permeation chromatography (GPC) technique using a 1% by weight solution of PLA in tetrahydrofuran (THF) and injecting a volume of 200 μL at a speed of 1 mL/min. The results obtained were: Mn=111800; Mw=168705 with a polydispersity index (PDI) Mw/Mn=1.50.

CPB Used in the Examples

The molecular weight of CPB was obtained by GPC. The results obtained were: copolymer $M_n$=60000, the weights of each block, $M_{n\varepsilon\text{-}CL}$=20000 and $M_{nL\text{-}Lactide}$=40000, with polydispersity index, IP=$M_w/M_n$=1.45.

1. Preparation of the Composition with Binary Mixtures by the Solution and Evaporation Technique Preparation of the Mixture i) and ii)
i) poly(L-, D-lactide) homopolymer (PLA) and
ii) poly(L-lactide) and poly(ε-caprolactone) diblock copolymer (CPB).

Table 3 below shows the proportions of each of the components of the composition for the preparation of the nanostructured material by solution and evaporation.

TABLE 3

| Binary mixture composition (% PLA/% CPB) | |
|---|---|
| Control (PLA) | 100/0 |
| Example 1 | 90/10 |
| Example 2 | 80/20 |
| Example 3 | 70/30 |
| Example 4 | 60/40 |
| Example 5 | 50/50 |

Solution of the poly(lactic acid) Homopolymer (PLA)

Preparation of solutions of 4% by weight of poly(lactic acid) (PLA) in CHCl$_3$, with stirring for 3.5 h at 40° C. The solution obtained was fully transparent.

Solution of the Diblock Copolymer (CPB)

A solution of 4% by weight of diblock copolymer (CPB) in CHCl$_3$ was prepared, which was maintained with stirring for 3.5 h at 40° C. The solution obtained was fully transparent.

Formation and Drying of the Films

The prepared solutions were mixed maintaining the temperature until the components were homogenised.

After homogenising the polymeric solutions of the mixtures (3.5 h at 40° C.), the films were obtained. To do this, the solution was poured on a Petri dish at temperature and humidity conditions of 23° C. and 50% RH and the solvent was allowed to evaporate until the film was formed, for 24 hours. After this period, the films were extracted and put in a desiccator to prevent absorption of humidity.

2. Preparation of the Composition with Binary Mixtures by the Compression Moulding Technique The same proportions of the components were prepared as in examples 1 to 5 above.

a.1) The thin sheets were produced by compression moulding using as raw material a powder obtained from the thin sheets prepared by solution-evaporation. Briefly, the polymeric solutions in chloroform were poured on a flat and horizontal plate and the solvent was evaporated at ambient temperature for 24 hours. The films obtained were released from the surface, frozen and milled to obtain a fine powder (50 µm and 150 µm).

a.2) The thin sheets were produced by compression moulding using as raw material the polymers in pellets. Firstly, the components were all dried and were mixed together in the corresponding proportions. Then the film was developed by compression moulding the pellet mixture between two aluminium plates. The parameters involved in the process such as the temperature of the plates, force and compression time were optimised. Once the films were obtained, they were frozen so that they could be milled to obtain a fine powder (50 µm and 150 µm) to make the mixture as homogeneous as possible.

Next, 1 g of film in powder was placed between two aluminium plates to obtain thin sheets with a thickness of between 175 and 225 µm. This assembly was put under pressure in a laboratory hydraulic press (Carver, Inc., Wabash, Ind., USA) heated to 155° C. To obtain homogeneous films it was necessary to apply successive stages of time/force. Firstly, a force of 5 t was applied for 3 min, then 10 t for 1 min, followed by 15 t for 1 min, finally 20 t for 1 min. The assembly was cooled to ambient temperature until the thin sheets solidified and could be released from the surface of the plates.

3. Preparation of the Composition with Binary Mixtures by the Extrusion Technique The same proportions of the components were prepared as in examples 1 to 5 above.

Before extrusion, the PLA pellets were dried for 3 hours at 90° C. in a vacuum oven. These conditions ensure that the PLA is completely dry before being fed into the extruder; humidity would degrade the PLA during processing as the polymer is very sensitive.

In the case of the diblock copolymer, the drying conditions do not have to be so strict as the ε-caprolactone block melts at low temperatures. For this reason, the block copolymer was dried at 40° C. for 15 hours in a conventional oven.

Once the components were mixed in the proportions desired, the mixture was processed in a twin screw mini-extruder (Micro 15 cc Twin ScrewCompounder) at the melting temperature of 199° C., at 100 rpm for 4 minutes. After the processing time, the nozzle was opened and the film was collected by a film winding system, with the winding speed being the only variable to set the thickness of the final film.

The variables for optimising the processing parameters to ensure that the extrusion occurred under optimum conditions were:

Rotation speed of the screws (rpm), or torque (N).
Temperature of the three zones of the extruder jacket.

The temperature profile, processing speed and residence time as variables for processing optimisation are given below.

| Temperature zone 1 (° C.) | Temperature zone 2 (° C.) | Temperature zone 3 (° C.) | Melting temperature (° C.) | Screw speed (rpm) | Residence time (min) |
|---|---|---|---|---|---|
| 200 | 205 | 210 | 200 | 100 | 4 |

4. Preparation of the Composition with Ternary Mixtures

The preparation of the composition with ternary mixtures by the techniques of solution and evaporation, compression moulding and extrusion moulding were repeated with the same parameters defined in the preparations 1 to 3 above, with the only difference that the poly(ε-caprolactone) homopolymer was added in the proportions defined in the ternary mixture as shown in Table 4 below.

TABLE 4

| | Ternary mixture composition % by weight (% PLA/% PCL/% CPB) |
|---|---|
| Control (PLA/PCL) | 80/20 |
| Example 6 | 80/20/1 |
| Example 7 | 80/20/3 |
| Example 8 | 80/20/5 |
| Example 9 | 80/20/7 |
| Example 10 | 80/20/10 |
| Example 11 | 80/20/30 |

Thus, in the solution and evaporation technique, a solution of the poly(ε-caprolactone) homopolymer (PCL) was prepared at 4% by weight in $CHCl_3$, stirred for 3.5 h at 40° C. The solution obtained was fully transparent and was mixed with the solutions of PLA and PCL prepared as described above.

Tests

To evaluate the properties of the new nanostructured biodegradable polymeric material obtained from the composition of the first aspect of the invention, tests were carried out for morphological characterisation, transparency, DSC, thermal stability, oxygen permeability and water vapour permeability.

Morphological Analysis of the Composition—Binary Mixtures

Figure 1:
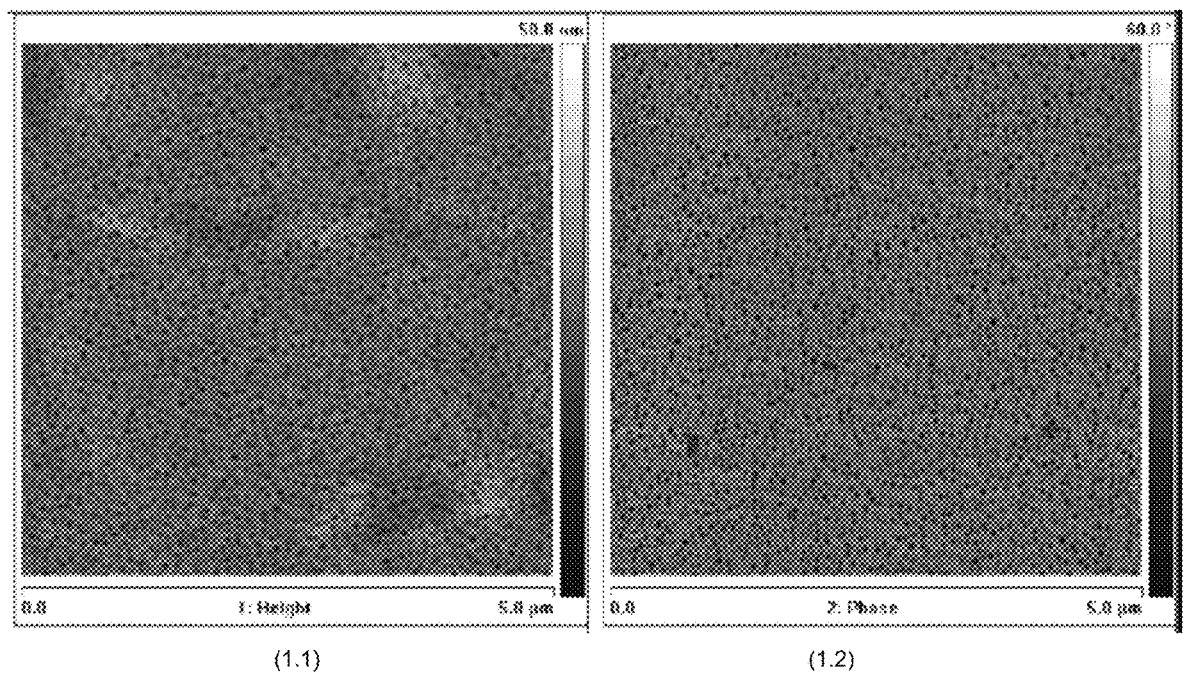
FIGS. 1-5 show the morphology by AFM height and phase imaging of a composition with binary mixtures of PLA and CPB in the following proportions by weight:
 80% by weight of PLA and 20% by weight of poly(L-lactide) and poly(ε-caprolactone) diblock copolymer
 70% by weight of PLA and 30% by weight of poly(L-lactide) and poly(ε-caprolactone) diblock copolymer
 50% by weight of PLA and 50% by weight of poly(L-lactide) and poly(ε-caprolactone) diblock copolymer
 30% by weight of PLA and 70% by weight of poly(L-lactide) and poly(ε-caprolactone) diblock copolymer
 20% by weight of PLA and 80% by weight of poly(L-lactide) and poly(ε-caprolactone) diblock copolymer In the height FIGS. 1.1, 2.1, 3.1, 4.1, 5.1) the height of each sample is shown, the majority of the images do not exceed 50 nm and are around 50° of phase. In the phase FIGS. 1.2, 2.2, 3.2, 4.2, 5.2) the darkest part is identified as the PCL block and the lighter part as the poly(lactic acid) matrix and the PLA block. If the PLA block and the poly(lactic acid) matrix were not miscible, 3 phases would have been distinguishable. The size of the sample selected is 5 μm as this is considered to be the most representative for showing binary mixture nanostructuring.
Figure 2:
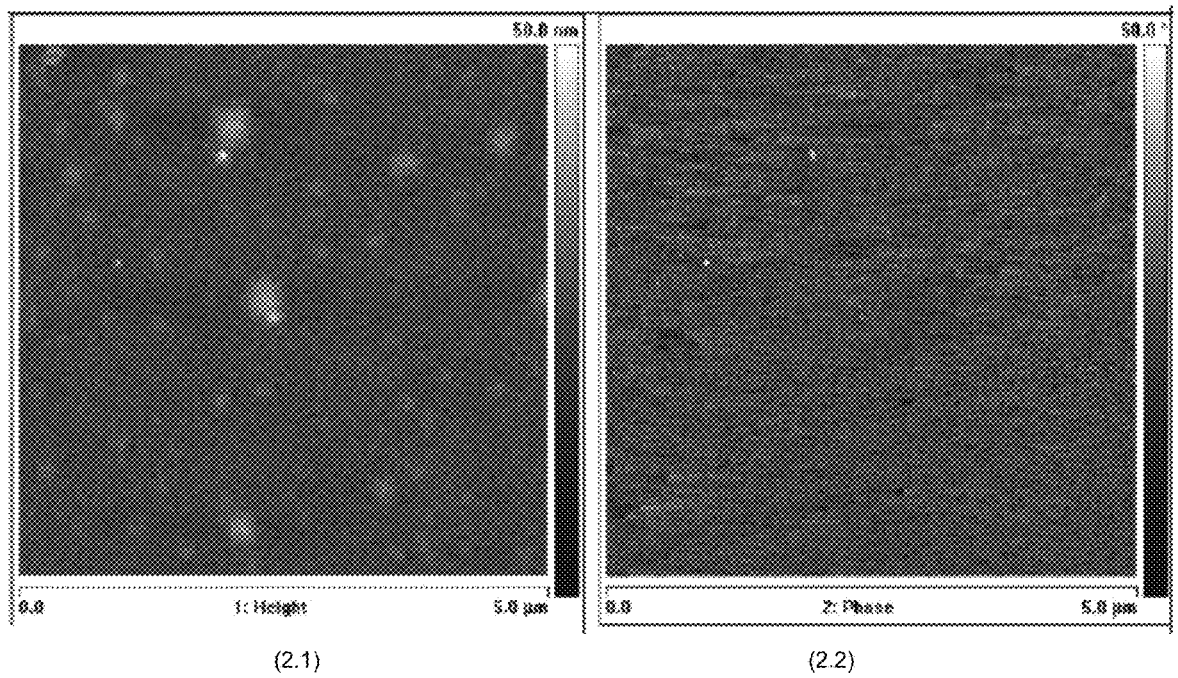
Figure 3:
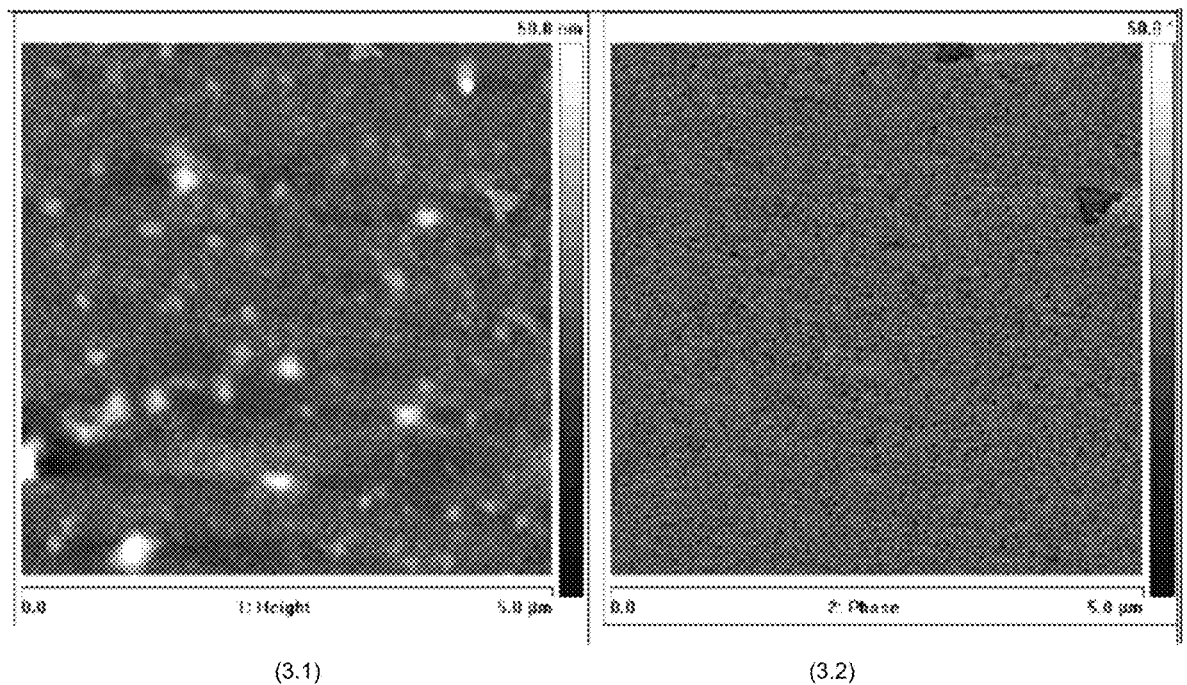
Figure 4:
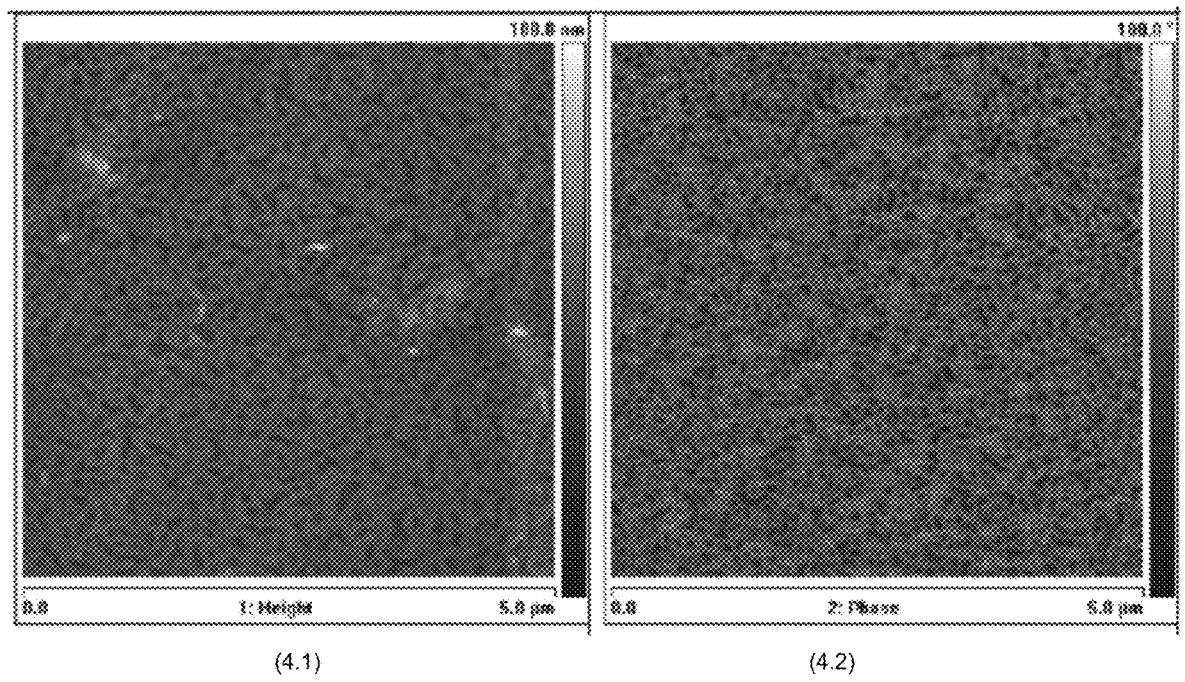
Figure 5:
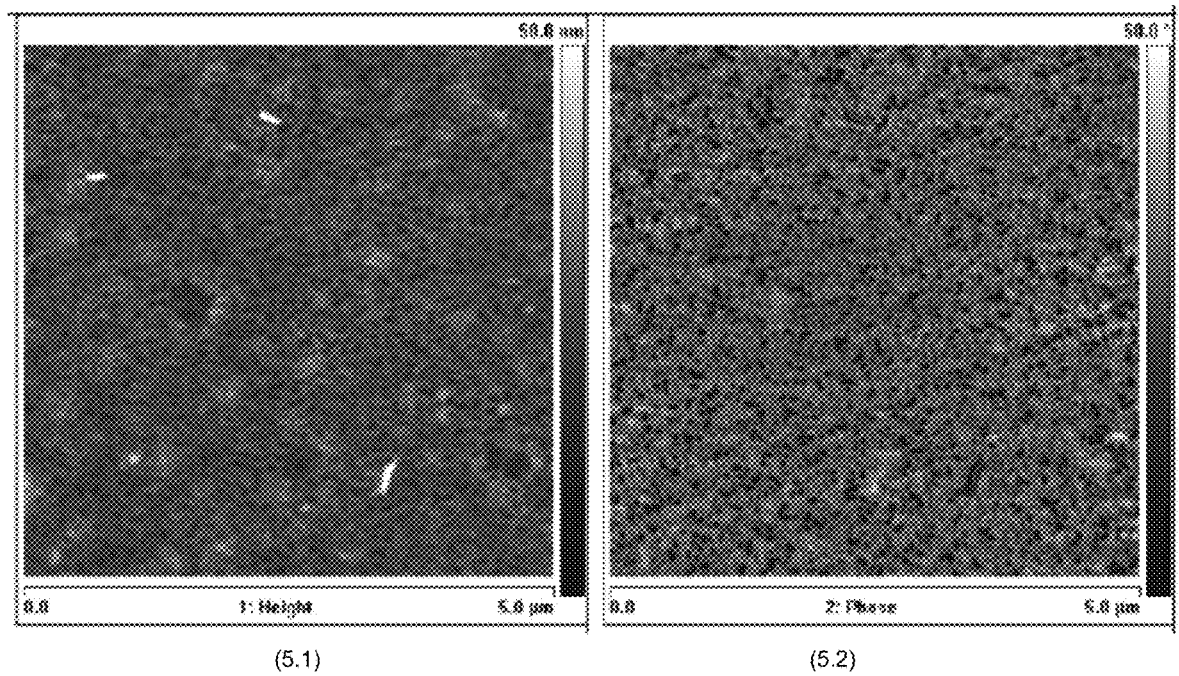
Figure 6:
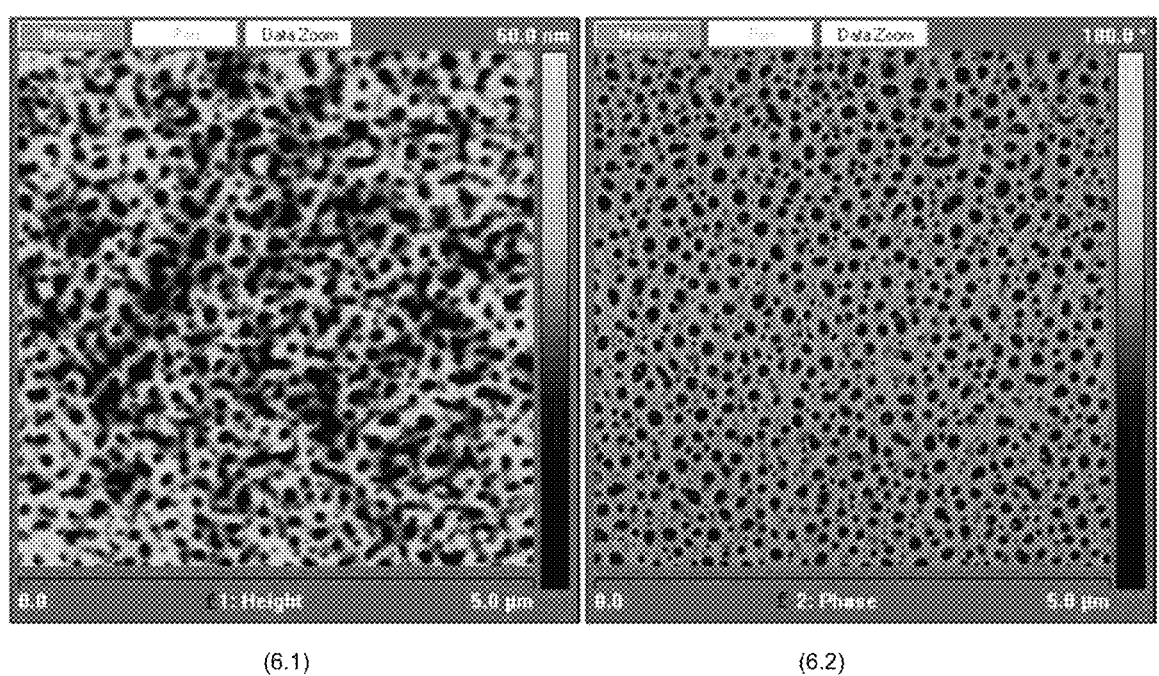
FIGS. 6-9 show the morphology by AFM height and phase imaging of a composition with ternary mixtures of PLA, PCL and CPB in the following proportions by weight:
 80% by weight of PLA and 20% by weight of PCL and 1% by weight of diblock copolymer (CPB)
 80% by weight of PLA and 20% by weight of PCL and 3% by weight of diblock copolymer (CPB)
 80% by weight of PLA and 20% by weight of PCL and 5% by weight of diblock copolymer (CPB)
 80% by weight of PLA and 20% by weight of PCL and 10% by weight of diblock copolymer (CPB)
Figure 7:
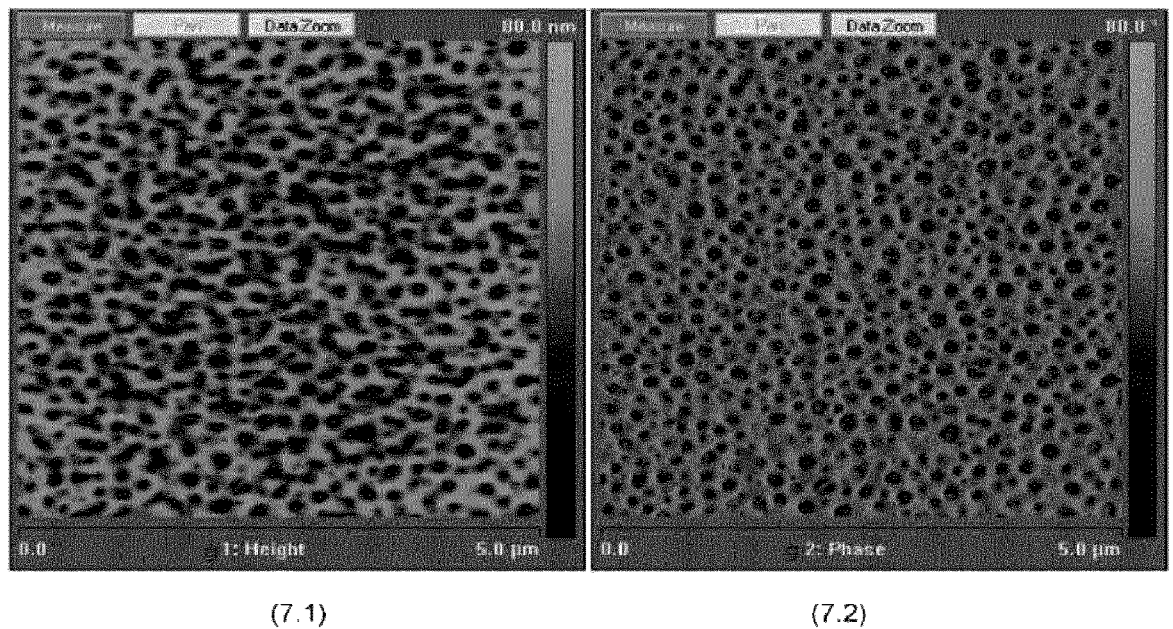
Figure 8:
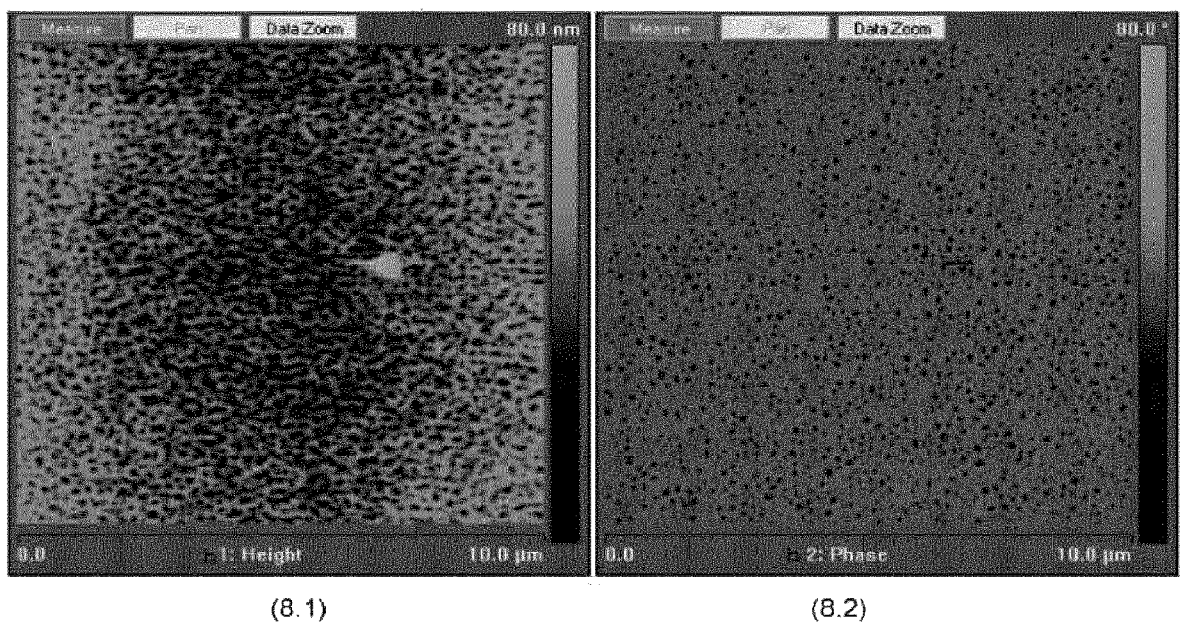
Figure 9:
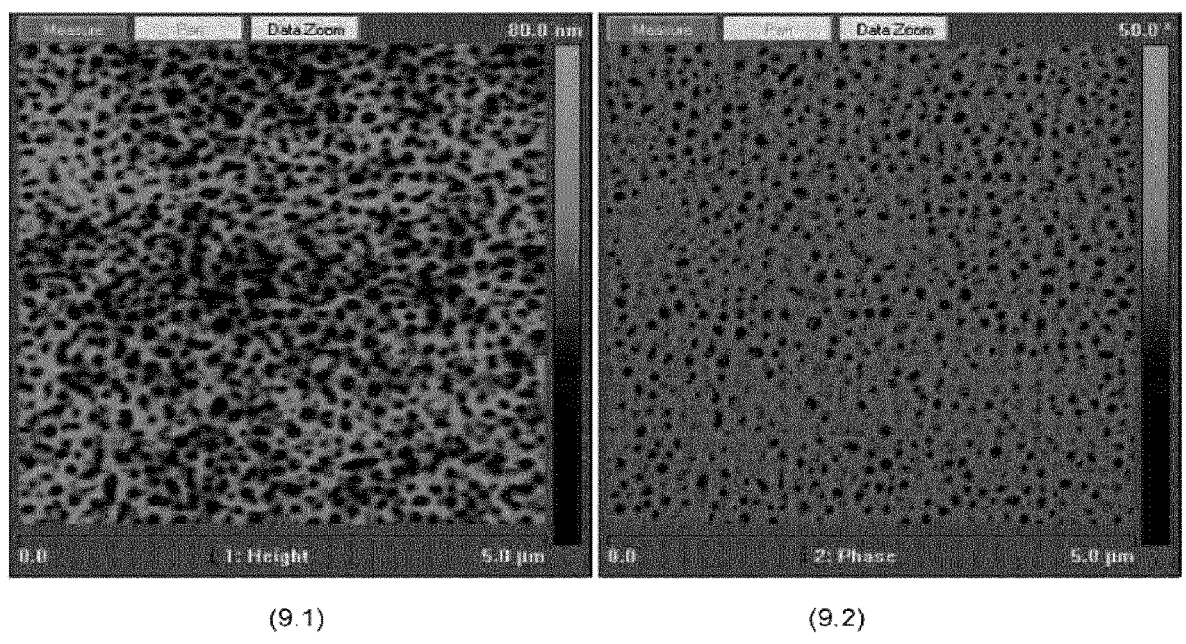

For morphological analysis by Atomic Force Microscopy (AFM) of each of the samples, the phase and height images of each were evaluated. See FIGS. 1 to 5 showing that the nanostructured biodegradable polymeric material obtained is characterised by the fact that it shows a two-phase mutually self-assembled nanostructure. If the PLA block and the poly(lactic acid) matrix were not miscible, 3 phases would have been distinguishable. The darkest part is identified as the PCL block and the lighter part as the poly(lactic acid) and the PLA block matrix and therefore this corroborates that the polymeric matrix is formed by poly(L-, D-lactide) monomer units and the poly(ε-caprolactone) monomer units are self-assembled in the matrix. The results of the test show that the morphology changed from a morphology of spherical micelles to a morphology of wormlike micelles (FIGS. 5.1 and 5.2), passing through a morphology of interconnected micelles (FIGS. 3.1 and 3.2).

Morphological Analysis of the Composition—Ternary Mixtures

For morphological analysis by Atomic Force Microscopy (AFM) of each of the samples, the phase and height images of each were evaluated. See FIGS. 6-9 showing that the nanostructured biodegradable polymeric material obtained is characterised by the fact that it shows a two-phase mutually self-assembled nanostructure. If there were no miscibility between the PLA block and the poly(lactic acid) matrix and between the PCL block and the poly(ε-caprolactone) matrix, 3 phases would be distinguishable. The darker part is identified as the PCL block and the poly(ε-caprolactone) matrix and the lighter part as the poly(lactic acid) matrix and the PLA block and therefore this corroborates that the polymeric matrix is formed by poly(L-, D-lactide) monomer units and the poly(ε-caprolactone) monomer units are self-assembled in the matrix.

Transparency of the Film or Thin Sheet Obtained

The transparency of the films obtained from the composition with a binary mixture and with a ternary mixture were analysed, observing good results in both cases. See FIG. 10.

The transmittance of the films was determined by UV-Visible spectrophotometry to quantify the degree of transparency of each of the different embodiments. Table 5 below shows the results obtained:

TABLE 5

| Binary mixture | % Transmittance | Ternary mixture | % Transmittance |
| --- | --- | --- | --- |
| 90PLA_10CPB | 99 (max. transparency) | 80PLA_20PCL_1CPB | 92 |
|  |  | 80PLA_20PCL_3CPB | 92 |
| 70PLA_30CPB | 98 | 80PLA_20PCL_5CPB | 90 |
| 50PLA_50CPB | 92 | 80PLA_20PCL_7CPB | 90 |
| 30PLA_70CPB | 90 | 80PLA_20PCL_10CPB | 89 |

Thermal Analysis by Differential Scanning Calorimetry (DSC)

For the thermal study of the composition with PLA and CPB binary mixtures, a 2nd melting scan was carried out obtaining the values shown in Table 6 below.

small peaks of crystallisation and melting being visible. However, with the addition of the diblock copolymer, the crystallinity of the PLA increased considerably.

Furthermore, the glass transition temperature reduced by between 4.5 and 8.5° C. as the diblock copolymer content increased. The reduction of the Tg of the PLA confirms some miscibility between the amorphous parts of both blocks, which suggests that the Tg of the PLA is also affected, given that the Tg of the ε-caprolactone block occurs at −67° C.

In the case of cold crystallisation temperature, the same occurred; while increasing the diblock copolymer (CPB) content the temperature of crystallisation (Tcc) was strongly reduced, indicating that the diblock copolymer acted as a nucleating agent in the formation of increasingly homogeneous crystals, given that the crystallisation peaks were increasingly narrow.

Finally, as regards the melting zone of the PLA, two peaks appeared in the series of mixtures, the first belonging to PLA and the second to the L-lactide block of the copolymer. The melting temperature (Tm) of the PLA reduced considerably as the diblock copolymer content became higher. However, the temperature of the L-lactide block was maintained, so there is an increasingly greater difference between the melting peaks, which could indicate that the miscibility of PLA with its block was reduced.

A thermal study of the composition with ternary mixtures of PLA, PCL and CPB was also carried out. Table 7 below shows the results obtained:

TABLE 6

| Composition with binary mixtures | PLA | | | | | | ε-CL block | |
| --- | --- | --- | --- | --- | --- | --- | --- | --- |
|  | Tg (° C.) | Tcc (° C.) | ΔHc (J/mol) | Tm (° C.) (PLA/PLA block) | ΔHm (J/mol) | X (%) | Tm (° C.) | ΔHm (J/mol) |
| PLA | 51 | 124 | 1.459 | 146 | 1.467 | 0.009 |  |  |
| 90PLA-10CPB | 46 | 107 | 19.43 | 144/152 | 26.54 | 7.645 | 53 | 4.352 |
| 80PLA-20CPB | 46 | 106 | 23.81 | 143/152 | 30.40 | 7.086 | 55 | 2.842 |
| 70PLA-30CPB | 46 | 98 | 23.03 | 141/151 | 30.71 | 8.258 | 54 | 3.382 |
| 60PLA-40CPB | 45 | 93 | 20.75 | 139/151 | 32.87 | 13.032 | 54 | 3.036 |
| 50PLA-50CPB | 43 | 87 | 18.74 | 137/150 | 34.56 | 17.011 | 53 | 4.235 |

Table 6 above shows that the properties of the PLA changed suddenly with the addition of the diblock copolymer (CPB). PLA film is practically amorphous, with very

TABLE 7

| Composition with ternary mixtures | PLA | | | | | | PCL | | |
| --- | --- | --- | --- | --- | --- | --- | --- | --- | --- |
|  | Tg (° C.) | Tcc (° C.) | ΔHcc (J/mol) | Tm (° C.) (PLA/PLA block) | ΔHm (J/mol) | X (%) | Tg (° C.) | Tm (° C.) | ΔHm (J/mol) |
| PLA | 54 | 130 | 0.5017 | 152 | 0.6431 | 0.15 | — | — | — |
| PCL | — | — | — | — | — | — | −64 | 54 | 76.11 |
| 80PLA-20PCL | — | 122 | 9.33 | 147 | 13.05 | 4 | — | 52 | 10.87 |
| 80PLA-20PCL-1CPB | — | 117 | 17 | 147 | 19.33 | 2.51 | — | 53 | 11.63 |
| 80PLA-20PCL-3CPB | — | 116 | 15.29 | 147 | 18.19 | 3.12 | — | 53 | 10.97 |
| 80PLA-20PCL-5CPB | — | 115 | 16.60 | 146/152 | 18.99 | 2.57 | — | 54 | 12.21 |
| 80PLA-20PCL-7CPB | — | 112 | 17.73 | 145/151 | 22.25 | 4.86 | — | 52 | 13.80 |
| 80PLA-20CPB-10CPB | — | 108 | 21.12 | 142/151 | 21.53 | 0.44 | — | 52 | 13.83 |

In this case, the properties of the mixture 80PLA-20PCL were significantly influenced by the different percentages of the diblock copolymer added, and these were different from those of the starting homopolymers. A sudden change in the crystallinity of pure PLA was observed, given that the homopolymer prepared by the same process is practically amorphous, with no appreciable crystallisation and melting peaks. These properties changed considerably in the starting mixture with PCL, so that this new composition component considerably affected the thermal properties of pure PLA.

Table 8 below includes the thermal properties of the diblock copolymer used in the composition.

TABLE 8

|  | Tg (° C.) | Tcc (° C.) | ΔHcc (J/mol) | Tm (° C.) | ΔHm (J/mol) | X (%) |
|---|---|---|---|---|---|---|
| L-lactide block | 81 | 86 | 10 | 158 | 20 | 0.15 |
| ε-CL block | −67 | — | — | 55 | 30 | 0.06 |

In the case of cold crystallisation, as the diblock copolymer content increased, the crystallisation temperature (Tc) moved towards lower temperatures, indicating that the diblock copolymer encourages cold crystallisation of the samples, forming increasingly homogeneous crystals, given that the crystallisation peaks were increasingly more defined and narrow.

As regards PLA melting, two peaks appeared in the mixtures with the diblock copolymer that did not appear in that of the mixture alone. The first belongs to the melting of the PLA homopolymer and the second to that of the L-lactide block of the copolymer. The melting temperature (Tm) of the PLA reduced considerably as the diblock copolymer content became higher. In the case of PCL melting, very defined peaks were observed, without the appearance of a second corresponding to the ε-caprolactone block, indicating that both the PCL homopolymer and the poly(ε-caprolactone) block are fully miscible.

Thermal Stability of the Composition with Binary Mixtures

A thermogravimetric analysis of the composition was carried out with the following proportions by weight of the components of the mixture. The data obtained are shown in Table 9 below.

TABLE 9

| Composition | Polymer loss | |
|---|---|---|
| Binary mixture | T(5% weight loss) | T(95% weight loss) |
| PLA | 338.37 | 397.56 |
| 90PLA-10CPB | 319 | 397.94 |
| 80PLA-20CPB | 302.44 | 409.25 |
| 70PLA-30CPB | 287.32 | 419.96 |
| 60PLA-40CPB | 283.65 | 424.12 |
| 50PLA-50CPB | 267.19 | 426.14 |

The thermal data of solvent loss indicated that pure PLA retained more solvent (chloroform) than binary mixtures containing the copolymer. Furthermore, this percentage reduced as the proportion of copolymer increased.

The temperature at which 95% loss of mass occurred increased with the diblock copolymer content and in turn the degradation peak corresponding to 5% of material moved to lower temperatures as the percentage of diblock copolymer increased. The rate of degradation reduced as the ε-caprolactone block content increased, therefore the temperature at which 95% loss of mass occurred increased.

With respect to the degradation mechanisms, whereas CPB degrades by random chain scission and mechanisms of specific chain end scission, PLA degrades by a process of multiple phases. That is why in mixtures of PLA with the diblock copolymer, various degradation peaks began to appear so that at low temperatures the dominant process is that of random chain scission and as the temperature increases, specific chain end scission takes place. In the case of PLA, the dominant reaction is intramolecular transesterification, giving rise to the formation of cyclic oligomers. Thus, as the diblock copolymer content increased, various degradation peaks began to appear. The first peak, which did not appear in the thermogram of PLA, corresponds to the degradation of the lactide block of the block copolymer, which appeared around 300° C., whereas the second corresponds to that of its homopolymer, which coincides with that of the film of PLA alone. Finally, the third degradation peak corresponds to the degradation of the ε-caprolactone block, around 415° C. As regards the shapes of the peaks, they were observed to be increasingly narrow with respect of each of the blocks as their content in the mixture increased and as the PLA homopolymer decreased. Therefore, the resultant mixtures of the invention are more thermally stable than PLA alone.

Thermal Stability of the Composition with Ternary Mixtures

A thermogravimetric analysis of the composition was carried out with the following proportions by weight of the components of the mixture. The data obtained are shown in Table 10 for the series 80/20 and in Table 11 for the series 70/30.

TABLE 10

| Composition | Polymer loss | |
|---|---|---|
| Ternary mixture | T(5% weight loss) | T(95% weight loss) |
| PLA | 342.02 | 390.74 |
| PCL | 382.01 | 445.89 |
| 80PLA-20PCL | 333.52 | 418.02 |
| 80PLA-20PCL-1% CPB | 320.17 | 416.23 |
| 80PLA-20PCL-3% CPB | 327.54 | 425.36 |
| 80PLA-20PCL-5% CPB | 319.75 | 417.81 |
| 80PLA-20PCL-7% CPB | 316.65 | 429.69 |
| 80PLA-20PCL-10% CPB | 300.87 | 413.46 |

TABLE 11

| Composition | Polymer loss | |
|---|---|---|
| Ternary mixture | T(5% weight loss) | T(95% weight loss) |
| 70PLA-30PCL | 339.49 | 430.90 |
| 70PLA-30PCL-1% CPB | 339.40 | 431.76 |
| 70PLA-30PCL-3% CPB | 337.43 | 432.72 |
| 70PLA-30PCL-5% CPB | 334.52 | 434.19 |
| 70PLA-30PCL-7% CPB | 325.42 | 433.56 |

The temperature at which 95% loss of mass occurred increased as the diblock polymer content increased, although slower in the 70PLA-30PCL compared to the 80PLA-20PCL ternary mixture and, in turn, the degradation peak corresponding to 5% degradation of material was displaced to lower temperatures as the percentage of diblock copolymer increased.

Permeability to Oxygen of the Composition with Binary Mixtures Expressed as the Oxygen Transmission Rate (OTR) (ASTM: D3985)

As shown in the results of Table 12 below, the oxygen transmission rate (OTR) of the composition with binary mixtures of PLA with the diblock copolymer was less than that of pure PLA. The lowest OTR was observed in the 70PLA-30CPB binary mixture. See FIG. 11.

TABLE 12

| Binary mixture composition | OTR (cc/m$^2$ · day) | Standard deviation |
|---|---|---|
| 90PLA-10CPB | 350.0 | 10.0 |
| 80PLA-20CPB | 336.6 | 12.1 |
| 70PLA-30CPB | 299.7 | 14.7 |
| 60PLA-40CPB | 344.4 | 7.3 |
| 50PLA-50CPB | 336.7 | 13.7 |

The percentage improvement in oxygen permeability compared to pure PLA of some of the binary mixtures of the composition are listed below. Thus, the mixture PLA+10% CPB: permeability improvement was 7% (i.e. OTR reduced by 7%). In the mixture PLA+20% CPB: permeability improvement was 32% (i.e. OTR reduced by 32%). In the mixture PLA+30% CPB: permeability improvement was 40% (i.e. OTR reduced by 40%). In the mixture PLA+40% CPB: permeability improvement was 30% (i.e. OTR reduced by 30%). In the mixture PLA+50% CPB: permeability improvement was 20% (i.e. OTR reduced by 20%).

Surprisingly, when the nanostructured biodegradable polymeric material was obtained by the extrusion method (see FIG. 13), the OTR values were still better. Therefore, it is preferable to obtain the nanostructured biodegradable polymeric material by the extrusion method in accordance with the claims attached.

Permeability to Oxygen of the Composition with Ternary Mixtures Expressed as the Oxygen Transmission Rate (OTR)

As shown in the results of Table 13 below the oxygen transmission rate (OTR) with ternary mixtures of PLA and PCL with the diblock copolymer were less than that of pure PLA. The lowest oxygen transmission rate (OTR) was observed in the 80PLA-20PCL-10CPB ternary mixture. See FIG. 12.

TABLE 13

| Composition ternary mixtures | OTR (cc/m$^2$ · day) | Error |
|---|---|---|
| 80PLA/20PCL | 619.2 | 36.8 |
| 80PLA/20PCL/1% CPB | 580 | 40 |
| 80PLA/20PCL/3% CPB | 551.0 | 56.8 |
| 80PLA/20PCL/5% CPB | 455.6 | 38.5 |
| 80PLA/20PCL/7% CPB | 440 | 20.0 |
| 80PLA/20PCL/10% CPB | 427.7 | 8.4 |

The results of the PLA80/PCL20 mixture with various percentages of diblock copolymer show that the addition of the diblock copolymer to the PLA and PCL mixture improved the oxygen barrier properties; this improvement increased as the percentage of block copolymer increased.

In addition, a study on the influence of time on the oxygen permeability values was carried out for some of the compositions and it was observed that this reduced in some compositions by up to 50%. The reduction was related to the degree of crystallinity of the samples. With time, the degree of crystallinity of the samples increased and with this the oxygen transmission rate decreased.

The percentage improvement in oxygen permeability compared to pure PLA of some of the ternary mixtures of the composition are listed below. Thus, in the mixture 80% PLA-20% PCL+3% CPB the permeability improved by 11% (i.e. OTR reduced by 11%). In the mixture 80% PLA-20% PCL+5% CPB the permeability improved by 30% (i.e. OTR reduced by 30%). In the mixture 80% PLA-20% PCL+10% CPB the permeability improved by 31% (i.e. OTR reduced by 31%). In the mixture 70% PLA-30% PCL+1% CPB the permeability improved by 15% (i.e. OTR reduced by 15%).

Permeability to Water Vapour of the Composition with Binary Mixtures Expressed as the Water Vapour Transmission Rate (WVTR) (ASTM: F1249)

The WVTR is of great importance for the quality of a container. The water vapour transmission rate (WVTR) test can ensure proper storage, transport and useful life of the product stored in the container. Measurement of WVTR enables evaluating the water vapour barrier properties of the transparent film or thin sheet obtained in accordance with the invention.

Table 14 below shows the values of water vapour transmission rate (WVTR) obtained. The compositions showed an improvement compared to pure PLA, and again the composition 70PLA-30CPB showed the lowest value. Therefore, this is the composition with the best water vapour barrier properties. See FIG. 14.

TABLE 14

| Binary mixture composition | WVTR (mg/m$^2$ · day) | Standard deviation |
|---|---|---|
| PLA | 117.3 | 20.8 |
| 90PLA-10CPB | 122.9 | 4.0 |
| 80PLA-20CPB | 111.8 | 13.4 |
| 70PLA-30CPB | 105.6 | 5.4 |
| 60PLA-40CPB | 134.6 | 5.5 |
| 50PLA-50CPB | 123.1 | 6.9 |

The percentage improvement in water vapour permeability compared to pure PLA of some of binary mixtures of the composition are listed below. Thus, in the mixture 70PLA-30% CPB the permeability improved by 10% (i.e. WVTR reduced by 10%).

Permeability to Water Vapour of the Composition with Ternary Mixtures Express as Water Vapour Transmission Rate (WVTR)

In the case of water vapour permeability (WVTR), Table 15 shows again that the permeability to water vapour reduced as the diblock copolymer content increased. Thus in the 80PLA-20% PCL with 10% CPB mixture, the permeability to water vapour improved by 11.5% (i.e. the WVTR reduced by 11.5%). See FIG. 15.

TABLE 15

| Composition ternary mixtures | WVTR (mg/m$^2$ · day) | Error |
|---|---|---|
| 80PLA/20PCL | 132.6 | 21.6 |
| 80PLA/20PCL/1% CPB | 130 | 15 |
| 80PLA/20PCL/3% CPB | 118.4 | 1.4 |
| 80PLA/20PCL/5% CPB | 112 | 4 |
| 80PLA/20PCL/7% CPB | 134.5 | 3.2 |
| 80PLA/20PCL/10% CPB | 100 | 5 |

The results of both barrier property tests, to oxygen and to water vapour, show that the nanostructured materials developed have better barrier properties than pure PLA, opening a new range of biodegradable materials for packaging applications.

Despite the fact that reference has been made to specific embodiments of the invention, it is evident that an expert in the field that the biodegradable composition for the preparation of a nanostructured biodegradable polymeric material described is susceptible to numerous variations and modifications, and all the details mentioned can be replaced by other technically equivalent materials without departing from the scope of protection defined by the attached claims.

What is claimed is:

1. Biodegradable composition for the preparation of a nanostructured biodegradable polymeric material, characterized in that the composition comprises a binary mixture of:
    i) poly(L-, D-lactide) homopolymer (PLA), and
    ii) poly(L-lactide-b-ε-caprolactone) diblock copolymer (CPB),
    wherein the diblock copolymer (CPB) satisfies all the following conditions:
        it has a molar mass of the L-lactide block of between 20,000 g/mol and 200,000 g/mol and a molar mass of the ε-caprolactone block of between 10,000 g/mol and 100,000 g/mol,
        it has a molar ratio between the L-lactide block and the ε-caprolactone block of 2:1,
    without any other polymer.

2. Biodegradable composition of claim 1, wherein the ε-caprolactone block of the diblock copolymer (CPB) is in a concentration of between 10% and 90% of the weight of the poly(L-, D-lactide) homopolymer (PLA).

3. Biodegradable composition of claim 2, wherein the ε-caprolactone block of the diblock copolymer (CPB) is in a concentration of between 20% and 80% of the weight of the poly(L-, D lactide) homopolymer (PLA).

4. Biodegradable composition of claim 2, wherein the ε-caprolactone block of the diblock copolymer (CPB) is in a concentration of between 20% and 40% of the weight of the poly(L-, D lactide) homopolymer (PLA).

5. Biodegradable composition of claim 1, wherein the diblock copolymer (CPB) consists of one L-Lactide block having one or more L-lactide stereoisomer units and one ε-caprolactone block having one or more ε-caprolactone monomer units.

6. Biodegradable composition of claim 1, wherein the diblock copolymer (CPB) has a molar mass of the L-lactide block of 40,000 g/mol and a molar mass of the ε-caprolactone block of 20,000 g/mol.

7. Process for obtaining a nanostructured biodegradable polymeric material with the composition of claim 1, wherein it comprises:
    a) preparing a solution of poly(L-, D-lactide) homopolymer (PLA) of from 0.5% to 10% by weight, with a polar organic solvent at a temperature below the boiling point of the solvent used;
    b) preparing a solution of poly(L-lactide-b-ε-caprolactone) diblock copolymer (CPB) of 0.5% to 10% by weight with a polar organic solvent at a temperature below the boiling point of the solvent used;
    c) mixing the solutions prepared in stages a) and b) keeping the temperature constant until homogenisation of the mixture components;
    d) pouring the mixture obtained in stage c) on a flat surface and allowing the solvent to evaporate at ambient temperature until the formation of a film or thin sheet; and finally,
    e) releasing the film or thin sheet of nanostructured biodegradable polymeric material from the flat surface.

8. Process for obtaining a nanostructured biodegradable polymeric material with the composition of claim 1, wherein it comprises:
    a) obtaining a film or thin sheet of nanostructured biodegradable polymeric material by:
        a.1) the solution and evaporation method comprising
            a.1.a) preparing a solution of poly(L-, D-lactide) homopolymer (PLA) of from 0.5% to 10% by weight with a polar organic solvent at a temperature below the boiling point of the solvent used;
            a.1.b) preparing a solution of poly(L-lactide-b-ε-caprolactone) diblock copolymer (CPB) of 0.5% to 10% by weight with a polar organic solvent at a temperature below the boiling point of the solvent used;
            a.1.c) mixing the solutions prepared in stages a.1.a) and a.1.b) keeping the temperature constant until homogenisation of the mixture components; and
            a.1.d) pouring the mixture obtained in stages a.1.c) on a flat surface and allowing the solvent to evaporate at ambient temperature until the formation of a film or thin sheet; or
        a.2) obtaining a binary mixture of poly(L-, D-lactide) homopolymer (PLA) and poly(L-lactide-b-ε-caprolactone) diblock copolymer (CPB) in the form of pellets, followed by drying, mixing the components and compression of the mixture between two plates by the application of pressure cycles until obtaining a film or thin sheet;
    b) freezing the film or thin sheet obtained in stage a) with an inert gas;
    c) milling the film or thin sheet to obtain a powder with a particle size of between 50 μm and 150 μm; and
    d) placing the powder between two plates and moulding the mixture between two plates by applying cycles of pressure until obtaining a thin sheet of nanostructured biodegradable polymeric material with a thickness of between 175 and 225 μm.

9. Process for obtaining a nanostructured biodegradable polymeric material with the composition of claim 1, wherein it comprises:
    a) drying of the components of the composition; and
    b) processing the dried components in a twin screw type extruder having a nozzle arranged for obtaining a film or thin sheet.

10. Nanostructured biodegradable polymeric material obtained from the composition defined in claim 1.

11. Nanostructured biodegradable polymeric material of claim 10, wherein it has a nanostructure of two mutually self-assembled phases, one phase being formed by a polymeric matrix of units of poly(L-, D-lactide) monomer and the other phase by units of poly(ε-caprolactone) monomer self-assembled with the matrix.

12. Nanostructured biodegradable polymeric material of claim 11, wherein the phase formed by units of poly(ε-caprolactone) monomer have a nanometric morphology selected from spherical micelles, interconnected micelles and wormlike micelles.

13. Method for manufacturing a plastic article comprising shaping or semiworking the nanostructured biodegradable polymeric material of claim 10 for the development of containers or biomedical applications.

14. The method of claim 13, wherein the article is a film or thin sheet.

15. Plastic article, film or thin sheet comprising the nanostructured biodegradable polymeric material of claim 10.

16. Nanostructured biodegradable polymeric material of claim 10, wherein ε-caprolactone block of the diblock copolymer (CPB) is present in a molar volume (Vm) within the range from 3.26% to 32.65% with respect of the total molar volume of the nanostructured material.

17. Biodegradable composition of claim 1, made to have a permeability to oxygen of up to 40% lower than of that of pure PLA with an identical ratio between the L- and D-lactide stereoisomer units, and made to have a permeability to water vapor of up to 15% lower than of that of pure PLA with an identical ratio between the L- and D-lactide stereoisomer units.

18. Biodegradable composition of claim 1, made to have a permeability to oxygen from 370 $cm^3/m^2 \cdot day$ to 80 $cm^3/m^2 \cdot day$, and made to have a permeability to water vapor from 150 $mg/m^2 \cdot day$ to 30 $mg/m^2 \cdot day$.

19. Biodegradable composition of claim 1, wherein the biodegradable composition is made to reduce oxygen and water vapor permeability.

* * * * *